United States Patent
Ehlis et al.

(10) Patent No.: US 11,773,277 B2
(45) Date of Patent: Oct. 3, 2023

(54) USE OF AN ULTRAVIOLET RADIATION ABSORBING POLYMER COMPOSITION (UVRAP) AS AN UV ABSORBING AGENT IN A COATING FOR NON-LIVING AND NON-KERATINOUS MATERIALS

(71) Applicant: BASF SE, Ludwigshafen am Rhein (DE)

(72) Inventors: Thomas Ehlis, Basel (CH); Wolfgang Peter, Ludwigshafen (DE)

(73) Assignee: BASF SE

( * ) Notice: Subject to any disclaimer, the term of this patent is extended or adjusted under 35 U.S.C. 154(b) by 530 days.

(21) Appl. No.: 17/045,098

(22) PCT Filed: Apr. 2, 2019

(86) PCT No.: PCT/EP2019/058232
§ 371 (c)(1),
(2) Date: Oct. 2, 2020

(87) PCT Pub. No.: WO2019/192982
PCT Pub. Date: Oct. 10, 2019

(65) Prior Publication Data
US 2021/0115270 A1   Apr. 22, 2021

(30) Foreign Application Priority Data
Apr. 4, 2018 (EP) .................... 18165628

(51) Int. Cl.
| | | |
|---|---|---|
| C09D 5/32 | (2006.01) | |
| C09D 7/65 | (2018.01) | |
| C09D 7/63 | (2018.01) | |
| C09D 175/04 | (2006.01) | |
| C08G 65/48 | (2006.01) | |

(52) U.S. Cl.
CPC .............. *C09D 5/32* (2013.01); *C08G 65/48* (2013.01); *C09D 7/63* (2018.01); *C09D 7/65* (2018.01); *C09D 175/04* (2013.01)

(58) Field of Classification Search
CPC ... C09D 5/32; C09D 7/65; C09D 7/63; C09D 175/04; C08G 65/48
USPC .......................................................... 524/91
See application file for complete search history.

(56) References Cited

U.S. PATENT DOCUMENTS

| | | |
|---|---|---|
| 3,213,058 A | 10/1965 | Boyle et al. |
| 4,325,863 A | 4/1982 | Hinsken et al. |
| 4,338,244 A | 7/1982 | Hinsken et al. |
| 5,175,312 A | 12/1992 | Dubs et al. |
| 5,216,052 A | 6/1993 | Nesvadba et al. |
| 5,252,643 A | 10/1993 | Nesvadba |
| 6,369,267 B1 | 4/2002 | Toan et al. |
| 6,620,904 B2 | 9/2003 | Lemke |
| 2002/0058781 A1 | 5/2002 | Lemke |
| 2002/0094320 A1* | 7/2002 | Toan ................ C07D 249/20 424/59 |
| 2015/0164771 A1 | 6/2015 | Daly et al. |
| 2018/0092819 A1 | 4/2018 | Ehlis et al. |

FOREIGN PATENT DOCUMENTS

| | | |
|---|---|---|
| DE | 29 14 427 A1 | 10/1980 |
| DE | 43 16 611 A1 | 11/1993 |
| DE | 43 16 622 A1 | 11/1993 |
| DE | 43 16 876 A1 | 11/1993 |
| DE | 43 38 361 A1 | 5/1995 |
| EP | 0 057 160 A1 | 8/1982 |
| EP | 0 280 650 A1 | 8/1988 |
| EP | 0 589 839 A1 | 3/1994 |
| EP | 0 591 102 A1 | 4/1994 |
| EP | 1 291 384 A1 | 3/2003 |
| EP | 3 305 279 A1 | 4/2018 |
| JP | 2-172938 A | 7/1990 |
| JP | 8-208628 A | 8/1996 |
| WO | WO 98/56852 A1 | 12/1998 |
| WO | WO 98/56853 A1 | 12/1998 |
| WO | WO 02/36534 A2 | 5/2002 |
| WO | WO 2007/092407 A2 | 8/2007 |
| WO | WO 2010/130752 A2 | 11/2010 |
| WO | WO 2011/086124 A1 | 7/2011 |
| WO | WO 2011/086127 A1 | 7/2011 |
| WO | WO 2011/098315 A1 | 8/2011 |
| WO | WO 2012/163936 A1 | 12/2012 |
| WO | WO 2015/122770 A1 | 8/2015 |
| WO | WO 2018/065341 A1 | 4/2018 |

OTHER PUBLICATIONS

Extended European Search Report dated Oct. 26, 2018 in Patent Application No. 18165628.1, 3 pages.
Von G. Jakobson, "Diglycerin und höhere Oligomere des Glycerins als Synthesebausteine," Fette, Seifen, Anstrichmittel, vol. 88, No. 3, 1986, pp. 101-106 (with English Abstract).
H.H. Wenk, et al., "Polyglycerol—A Versatile Building Block for Sustainable Cosmetic Raw Materials," SOFW Journal, vol. 135, No. 8, 2009, 6 pages.
International Preliminary Report on Patentability and Written Opinion dated Oct. 6, 2020 in PCT/EP2019/058232 (English Translation only), 6 pages.

(Continued)

*Primary Examiner* — Kelechi C Egwim
(74) *Attorney, Agent, or Firm* — Faegre Drinker Biddle & Reath LLP

(57) ABSTRACT

The present invention relates to the use of an ultraviolet radiation absorbing polymer composition (UVRAP) as an UV absorbing agent in a coating for non-living and non-keratinous materials and a composition stabilized against light-induced degradation comprising a coating for non-living and non-keratinous materials subject to light-induced degradation, and the ultraviolet radiation absorbing polymer composition (UVRAP).

4 Claims, 1 Drawing Sheet

(56) References Cited

OTHER PUBLICATIONS

International Search Report dated Jun. 26, 2019 in PCT/EP2019/058232 filed on Apr. 2, 2019.

* cited by examiner

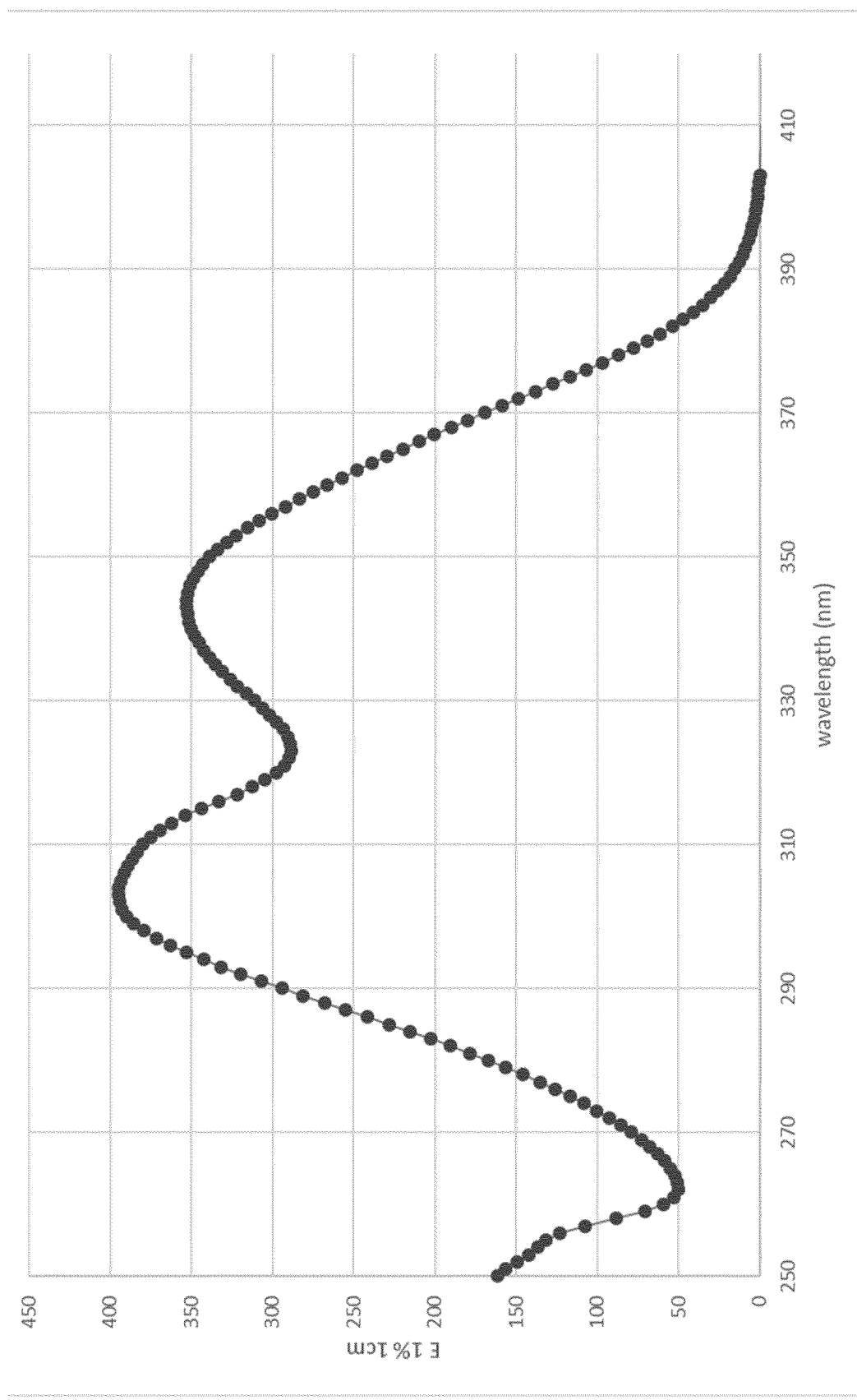

USE OF AN ULTRAVIOLET RADIATION ABSORBING POLYMER COMPOSITION (UVRAP) AS AN UV ABSORBING AGENT IN A COATING FOR NON-LIVING AND NON-KERATINOUS MATERIALS

FIELD OF THE INVENTION

The present invention relates to the use of an ultraviolet radiation absorbing polymer composition (UVRAP) as an UV absorbing agent in a coating for non-living and non-keratinous materials and a composition stabilized against light-induced degradation comprising a coating for non-living and non-keratinous materials subject to light-induced degradation, and the ultraviolet radiation absorbing polymer composition (UVRAP).

BACKGROUND OF THE INVENTION

Coatings made from organic materials are typically exposed to light, heat, and temperature changes (i.e., weathering). This may lead to undesired alterations such as color deviation, loss of gloss or even to cracking and delamination. These alterations are often mainly due to light, in particular UV-light, which leads to photochemically induced degradation reactions. Light stabilization of coatings is therefore crucial in order to maintain their mechanical properties, appearance and gloss, which are expected to remain unchanged for many years. The induction of these degradation reactions is largely prevented by adding a compound that absorbs UV-light. The compound that absorbs UV-light reduces the intensity of UV-light within the coating. However, according to the Lambert-Beer-Law, a significant reduction of UV-Intensity can only be achieved in the part of the coating that is not at the surface. No significant reduction of UV-intensity is achieved at the surface of the coating. Degradation reactions are thus induced at the surface of the coating even if a compound that absorbs UV-light is present. For this reason, a HALS (Hindered Amine Light Stabilizer) is typically added as a complementary stabilizer. In most cases it is a derivative of 2,2,6,6-tetramethylpiperidine. HALS compounds scavenge efficiently free radicals formed at the coating surface, where minor or no protection through the UVA is given. This process has been extensively studied and is essentially a cyclic chain breaking antioxidant process which is known as the Denisov cycle.

EP 280 650 A1 describes the use of benzotriazole derivatives as photoprotecting agents for recording materials for inkjet printing. EP 057 160 A1 discloses 2-(2-hydroxyphenyl)benzotriazoles, their use as UV absorbers and their preparation. U.S. Pat. No. 3,213,058 discloses ohydroxyphenylbenzotriazoles and their use as UV absorbers in plastics.

WO 2011/086124 discloses benzotriazole compounds of the formula formula (I)

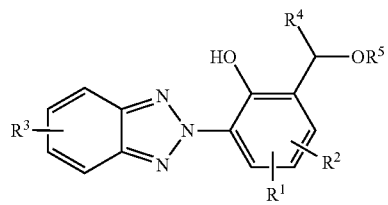

wherein $R^1$ and $R^2$ are hydrogen, $C_{1-30}$alkyl, $C_{1-5}$alkoxy, $C_{1-5}$alkoxycarbonyl, $C_{5-7}$cycloalkyl; $C_{6-10}$aryl or aralkyl; $R^3$ is hydrogen, $C_{1-5}$alkyl, $C_{1-5}$alkoxy, or halogen; $R^4$ is hydrogen, $C_{1-5}$alkyl; and $R^5$ is $C_{1-30}$alkyl or $C_{5-10}$cycloalkyl. The compounds are useful as photostabilizer and solubilizer for dibenzoylmethane derivatives and are used in cosmetic sun care compositions.

WO 2010/130752 describes high molecular non-polar benzotriazoles that are useful of stabilizing plastics against the effect of light.

WO 2011/086127 and WO 2012/163936 describe processes for preparing 2-(2-hydroxyphenyl)benzotriazole compounds.

JP 8-208628 discloses UV absorbers of formula (4)

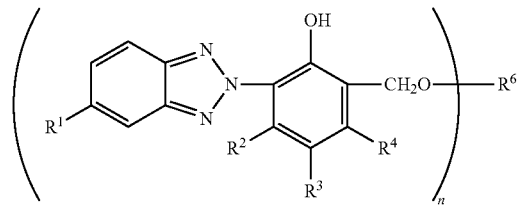

wherein $R^1$ is hydrogen, halogen, $C_1$-$C_{12}$ alkyl or alkoxy; $R^2$ and $R^4$ are hydrogen, $C_1$-$C_{10}$ alkyl, aryl, aralkyl, alkoxy or phenoxy; $R^3$ is $C_1$-$C_{12}$ alkyl, aryl, aralkyl, alkoxy or phenoxy; $R^6$ is $C_1$-$C_{20}$ alkyl, aryl or aralkyl; and n is an integer of 1 to 4.

However, there is a continuous need in the art for providing an UV absorbing agent which is suitable for the use in a coating for non-living and non-keratinous materials. In particular, it is desirable to provide an UV absorbing agent that is characterized by good photo stability in the coating for non-living and non-keratinous materials. Furthermore, it is desirable to provide an UV absorbing agent resulting in high gloss retention in the coating for non-living and non-keratinous materials. In addition thereto, it is desirable to provide an UV absorbing agent that shows high migration resistance in the coating for non-living and non-keratinous materials in combination with low volatility.

Accordingly, it is an object of the present invention to provide an UV absorbing agent that can be used in a coating for non-living and non-keratinous materials. It is a further object of the present invention to provide an UV absorbing agent that shows a good photo stability as well as high gloss retention in the coating for non-living and non-keratinous materials. It is an even further object of the present invention to provide an UV absorbing agent that shows high migration resistance in the coating for non-living and non-keratinous materials along with low volatility.

SUMMARY OF THE INVENTION

The foregoing and other objects are solved by the subject-matter of the present invention.

According to a first aspect of the present invention, the use of an ultraviolet radiation absorbing polymer composition (UVRAP) as an UV absorbing agent in a coating for non-living and non-keratinous materials is provided. The ultraviolet radiation absorbing polymer composition comprises the polymer compound of the general formula (I)

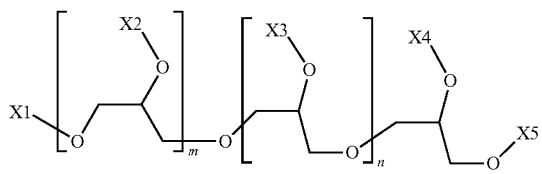
(I)

wherein n and m, independently from each other, are a number from 0 to 20, and at least one of m and n is ≥1, and X1, X2, X3, X4 and X5 are the same or different and are independently selected from H, C(O)R1 with R1 being $C_8$-$C_{24}$-alkyl, or a group of the general formula (II)

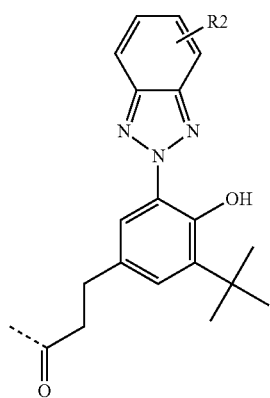
(II)

with R2 being H or halogen.

The inventors surprisingly found out that the ultraviolet radiation absorbing polymer composition (UVRAP) can be used as UV absorbing agent in a coating for non-living and non-keratinous materials. Furthermore, the ultraviolet radiation absorbing polymer composition (UVRAP) is characterized by a good photo stability as well as high gloss retention in the coating for non-living and non-keratinous materials. Furthermore, the ultraviolet radiation absorbing polymer composition (UVRAP) can fully react e.g. into isocyanate or melamine crosslinking coatings, and thus results in high migration resistance along with very low volatility.

Advantageous embodiments of the inventive process are defined in the corresponding subclaims.

According to one embodiment, the polymer compound of the general formula (I) has an average molecular weight ($M_w$) of >300 Da.

According to another embodiment, the polymer compound of the general formula (I) has E 1% 1 cm (343-344 nm) of >200 nm According to yet another embodiment, the ultraviolet radiation absorbing polymer composition additionally comprises one or more components selected from the group comprising benzenepropanoic acid, 3-(2H-benzotriazol-2-yl)-5-(1,1-dimethylethyl)-4-hydroxy-,methyl ester, benzenepropanoic acid, 3-(2H-benzotriazol-2-yl)-5-(1, 1-dimethylethyl)-4-hydroxy-, methanol and tin.

According to one embodiment, the concentration of benzenepropanoic acid, 3-(2H-benzotriazol-2-yl)-5-(1,1-dimethylethyl)-4-hydroxy-, methyl ester and/or benzenepropanoic acid, 3-(2H-benzotriazol-2-yl)-5-(1,1-dimethylethyl)-4-hydroxy- in the ultraviolet radiation absorbing polymer composition is ≤5.0 wt.-%, based on the total weight of the ultraviolet radiation absorbing polymer composition.

According to another embodiment, the sum of the concentrations of benzenepropanoic acid, 3-(2H-benzotriazol-2-yl)-5-(1, 1-dimethylethyl)-4-hydroxy- and 3-(2H-benzotriazol-2-yl)-5-(1,1-dimethylethyl)-4-hydroxy-,methyl ester in the ultraviolet radiation absorbing polymer composition is ≤5.0 wt.-%, based on the total weight of the ultraviolet radiation absorbing polymer composition.

According to yet another embodiment, wherein the concentration of tin in the ultraviolet radiation absorbing polymer composition is <700 ppm.

According to one embodiment, the ultraviolet radiation absorbing polymer composition is essentially free of tin.

According to another embodiment, the concentration of methanol in the ultraviolet radiation absorbing polymer composition is <3,000 ppm.

According to yet another embodiment, the polymer compound of the general formula (I) comprises an amount of covalently bound chromophores of >70 wt.-%, based on the total weight of the polymer compound.

According to one embodiment, the non-living and non-keratinous material is selected from wood, ceramic materials, metal, plastics, and articles coated or stained with organic materials.

According to a further aspect of the present invention, a composition stabilized against light-induced degradation comprising
 a) a coating for non-living and non-keratinous materials subject to light-induced degradation, and
 b) an ultraviolet radiation absorbing polymer composition (UVRAP) as defined herein.

According to one embodiment, the composition contains additionally a sterically hindered amine stabilizer and/or a UV absorber selected from the group of hydroxy-phenyl-s-triazines, oxanilides, hydroxybenzophenones, benzoates, cyanoacrylates and benzotriazoles different from those defined in general formula (I).

According to yet another embodiment, the coating is an automotive coating, an industrial coating or a wood coating.

According to one embodiment, the compound of general formula (I) is present in an amount of from 0.1 to 10% by weight, based on the dry weight of the coating.

In the following, the details and preferred embodiments of the inventive use of an ultraviolet radiation absorbing polymer composition (UVRAP) as an UV absorbing agent in a coating for non-living and non-keratinous materials will be described in more detail. It is to be understood that these technical details and embodiments also apply to the inventive composition.

DETAILED DESCRIPTION OF THE INVENTION

The use of an ultraviolet radiation absorbing polymer composition (UVRAP) as an UV absorbing agent in a coating for non-living and non-keratinous materials is provided. It is required that the ultraviolet radiation absorbing polymer composition comprises the polymer compound of the general formula (I)

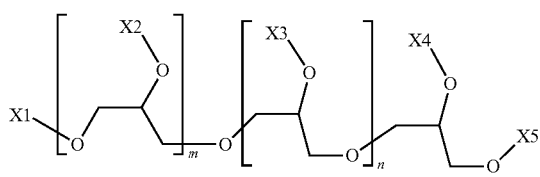

(I)

wherein n and m, independently from each other, are a number from 0 to 20, and at least one of m and n is ≥1; and X1, X2, X3, X4 and X5 are the same or different and are independently selected from H, C(O)R1 with R1 being $C_8$-$C_{24}$-alkyl, or a group of the general formula (II)

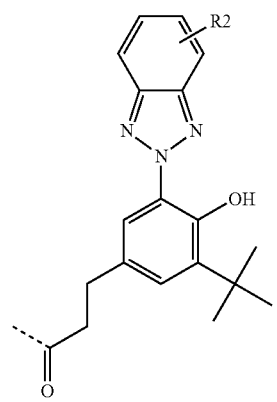

(II)

with R2 being H or halogen.

It is preferred that in the polymer compound of the general formula (I), n and m, independently from each other, are a number from 0 to 20, and at least one of m and n is ≥1; and X1, X2, X3, X4 and X5 are the same or different and are independently selected from H, C(O)R1 with R1 being $C_8$-$C_{24}$-alkyl, or a group of the general formula (II)

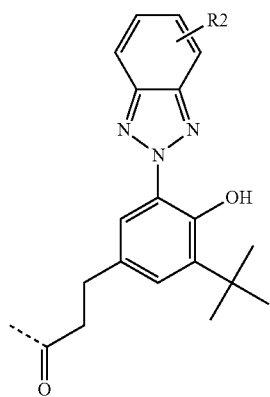

(II)

with R2 being H.

More preferably, in the polymer compound of the general formula (I), n and m, independently from each other, are a number from 0 to 20, and at least one of m and n is ≥1; and X1, X2, X3, X4 and X5 are the same or different and are independently selected from H, or a group of the general formula (II)

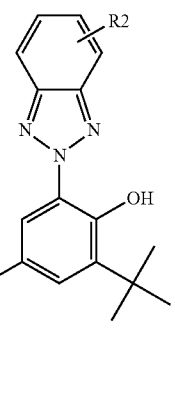

(II)

with R2 being H.

Alternatively, in the polymer compound of the general formula (I), n and m, independently from each other, are a number from 0 to 20, and at least one of m and n is ≥1; and X1, X2, X3, X4 and X5 are the same or different and are independently selected from C(O)R1 with R1 being $C_8$-$C_{24}$-alkyl, or a group of the general formula (II)

(II)

with R2 being H.

Alternatively, in the polymer compound of the general formula (I), n and m, independently from each other, are a number from 0 to 20, and at least one of m and n is ≥1; and X1, X2, X3, X4 and X5 are the same or different and are independently selected from H, C(O)R1 with R1 being $C_8$-$C_{24}$-alkyl, or a group of the general formula (II)

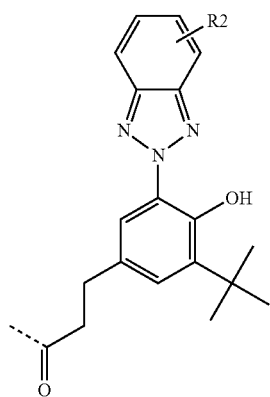

(II)

with R2 being halogen.

The term "$C_8$-$C_{24}$-alkyl" in the meaning of the present invention refers to a linear or branched chain alkyl group having 8 to 24 carbon atoms, and includes, for example, octyl, nonyl, decanyl, undecanyl, dodecanyl, lauryl, myristyl, palmityl, stearyl, arachinyl, behenyl.

Preferably, R1 in the polymer compound of the general formula (I) is $C_{12}$-$C_{22}$-alkyl, more preferably $C_{14}$-$C_{20}$-alkyl and most preferably $C_{16}$- or $C_{18}$-alkyl, such as palmityl or stearyl. For example, R1 in the polymer compound of the general formula (I) is stearyl.

The term "halogen" in the meaning of the present invention refers to fluoro, chloro, bromo or iodo. Preferably, the halogen is chloro.

Accordingly, if R2 in the group of the general formula (II) is a halogen, R2 is preferably chloro.

However, in one preferred embodiment R2 in the group of the general formula (II) is H.

In one embodiment, X1, X2, X4 and X5 in the polymer compound of the general formula (I) are the same. Preferably, X1, X2, X4 and X5 in the polymer compound of the general formula (I) are the same and are a group of the general formula (II)

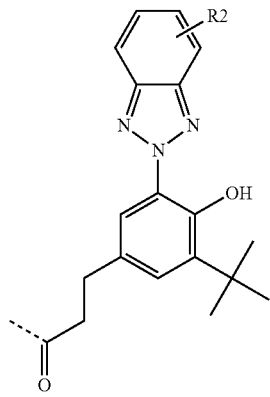

(II)

with R2 being H or halogen, preferably H.

It is appreciated that X3 is preferably H or C(O)R1 with R1 being $C_8$-$C_{24}$-alkyl, more preferably C(O)R1 with R1 being $C_8$-$C_{24}$-alkyl.

In one embodiment, it is thus preferred that X3 in the polymer compound of the general formula (I) differs from X1, X2, X4 and X5. More preferably, X1, X2, X4 and X5 in the polymer compound of the general formula (I) are the same and are a group of the general formula (II)

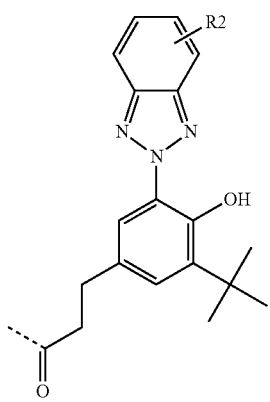

(II)

with R2 being H or halogen, preferably H, and X3 is H or C(O)R1 with R1 being $C_8$-$C_{24}$-alkyl.

For example, X1, X2, X4 and X5 in the polymer compound of the general formula (I) are the same and are a group of the general formula (II)

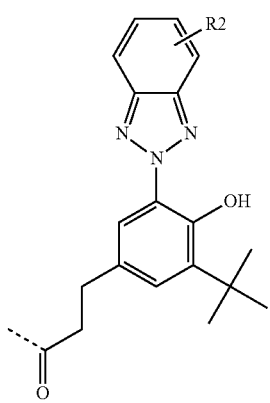

(II)

with R2 being H or halogen, preferably H, and X3 is C(O)R1 with R1 being $C_8$-$C_{24}$-alkyl.

Alternatively, X1, X2, X4 and X5 in the polymer compound of the general formula (I) are the same and are a group of the general formula (II)

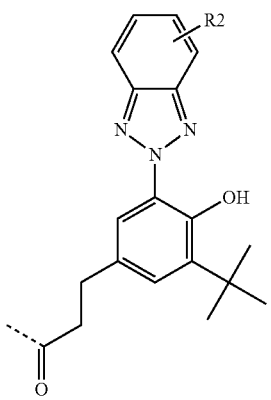

(II)

with R2 being H or halogen, preferably H, and X3 is H.

As already mentioned, n and m in the polymer compound of the general formula (I), independently from each other, are a number from 0 to 20, and at least one of m and n is ≥1. It is preferred that n and m in the polymer compound of the general formula (I), independently from each other, are a number from 1 to 20. That is to say, m and n are ≥1.

In one embodiment, n and m in the polymer compound of the general formula (I), independently from each other, are a number from 1 to 18, preferably from 1 to 16 and most preferably from 1 to 15.

It is appreciated that m and n, independently from each other, are a number selected from 1, 2, 3, 4, 5, 6, 7, 8, 9, 10, 11, 12, 13, 14 and 15.

In general, the polymer compound of the general formula (I) comprises an amount of covalently bound chromophores of >70 wt.-%, based on the total weight of the polymer compound.

Additionally or alternatively, the polymer compound of the general formula (I) has E 1% 1 cm (343-344 nm) of >200 nm.

The polymer compound of the general formula (I) represents a UV absorbing polyether that absorbs radiation in wavelengths between 290 and 400 nm.

According to one embodiment, the polymer compound of the general formula (I) has an average molecular weight ($M_w$) of >300 Da. In one embodiment, $M_w$ is in the range of about 300 to about 50,000 Da. In another embodiment, the $M_w$ is in the range of about 500 to about 20,000 Da, such as from about 500 to about 10,000 Da.

The ultraviolet radiation absorbing polymer composition comprising the polymer compound of the general formula (I) is preferably prepared in an esterification/transesterification including the steps of reacting a polyglycerol intermediate (6 or 7), i.e. polyglycerol or polyglycerol alkylate, with a benzotriazole UV-chromophore (5) comprising a complementary functional group A to form the polymer compound (3 or 4) according to the following reaction scheme:

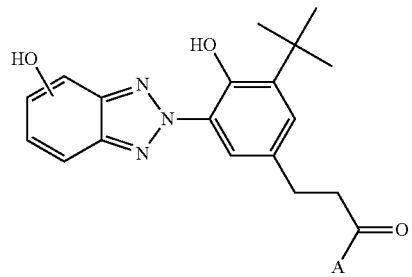

5

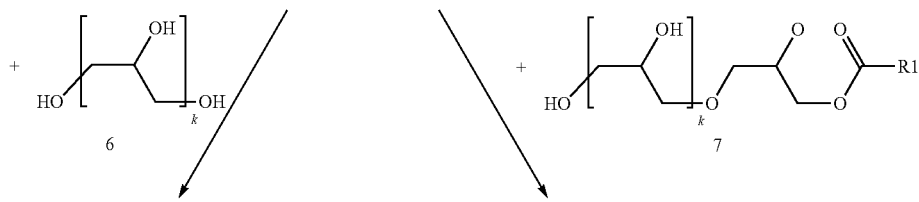

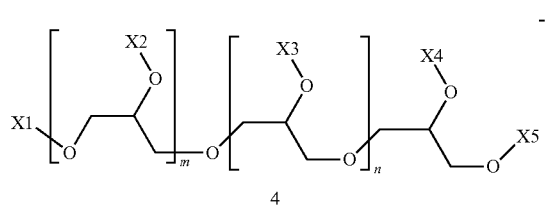

4

X1, X2, X3, X4, X5 =

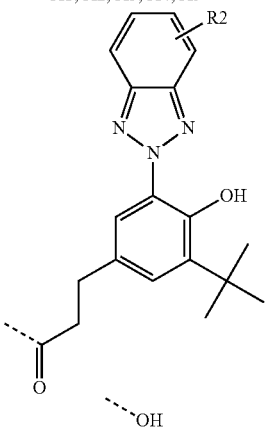

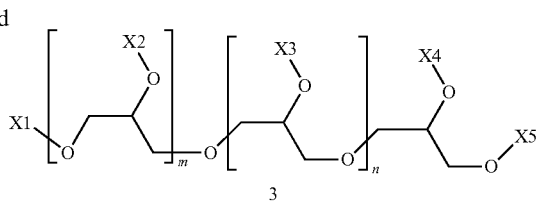

3

X1, X2, X3, X4, X5 =

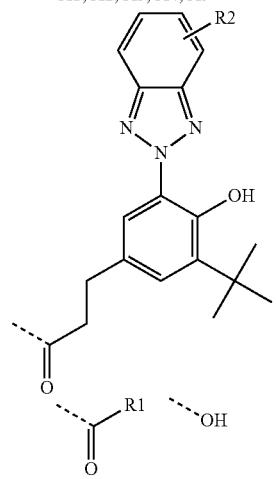

wherein further n and m, independently from each other, are a number from 0 to 20, and at least one of m and n is ≥1; A is selected from OH, OMe and OEt; k is a number from 1 to 40; R1 being $C_8$-$C_{24}$-alkyl and R2 is H or halogen.

Such processes are well known in the art and are for example described in US2015 0164771.

The benzotriazole derivatives according to formula (5) represent the UV chromophore moiety of the present ultraviolet radiation absorbing composition.

Most preferred compounds according to formula (5) are benzenepropanoic acid, 3-(2H-benzotriazol-2-yl)-5-(1,1-dimethylethyl)-4-hydroxy-, methyl ester corresponding to formula

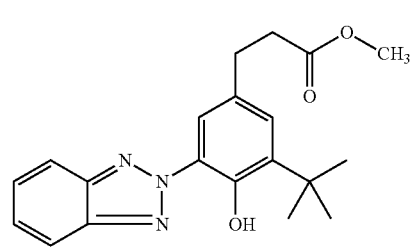

(5a)

(CAS Registry Number 84268-33-7); benzenepropanoic acid, 3-(2H-benzotriazol-2-yl)-5-(1,1-dimethylethyl)-4-hydroxy-, methyl ester corresponding to formula

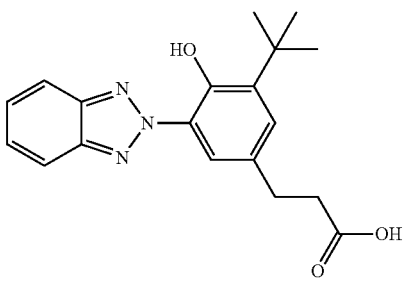

(5b)

(CAS Registry Number 84268-36-0), or the compound according to formula (5a) or (5b) having a chloro substituent corresponding to formula

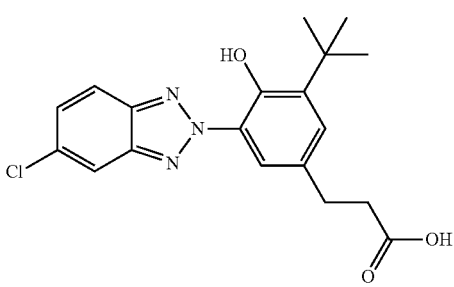

(5c)

Preferably, the compound according to formula (5) is a compound corresponding to formula (5a) or (5b).

Polyglycerol (CAS Registry Number 25618-55-7; 1, 2, 3-propanetriol, homopolymer) corresponding to formula (6) is known as a versatile building block for sustainable cosmetic raw materials (Wenk, H. H.; Meyer, J.; SOFW Journal, 2009, volume 135, issue 8, pages 25-30).

Polyglycerol is an ether linked homopolymer of glycerol, which is available in different degrees of polymerization, where higher polymers are associated with increasing hydrophilicity and molecular weight. Although the idealized structure of polyglycerol—a 1,3-linked, linear polymer is rather simple, the reality is much more complex. Polyglycerols are mixtures of a number of structures, which are defined by oligomer distribution, degree of branching, and amount of cyclic structures. Even products with the same average molecular weight may differ significantly in their properties.

The oligomerization of glycerol is a consecutive reaction, and complete conversion of glycerol favors formation of high molecular-weight glycerol oligo- and polymers.

The general structural formula for polyglycerol can be sketched from the following formula (8) as

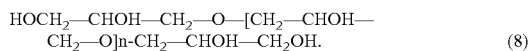
(8)

wherein
n=0 results in diglycerol,
n=1 in triglycerol, n=2 in tetraglycerol etc., including branched isomers formed by reaction of secondary hydroxyls.

Beside linear polyglycerol cyclic oligomers can be formed by further condensation (Diglycerin und hoehere Oligomere des Glycerins als Synthesebausteine, Jakobson, G., Fette, Seifen Anstrichmittel, 1986, volume 88, pages 101-106).

With the increase of molecular weight the hydroxyl number of polyglycerol decreases (diglycerol comprises 4, triglycerol 5, tetraglycerol 6 etc. hydroxy groups). In some embodiments, the glycerol-based composition is fractionated to produce the desired distribution of glycerol polymers and a desired hydroxyl value.

Detailed synthesis procedures for the preparation of polyglycerol are described in WO2011098315, WO2015122770, WO2002036534, US20020058781, U.S. Pat. No. 6,620,904 and WO2007092407.

Preferred catalysts for the preparation of polyglycerol are $K_2CO_3$, $Li_2CO_3$, $Na_2CO_3$, KOH, NaOH, $CH_3ONa$, $Ca(OH)_2$, LiOH, $MgCO_3$, MgO, CaO, $CaCO_3$, ZnO, CsOH, $Cs_2CO_3$, $NaHCO_3$, $CsHCO_3$, SrO and BaO.

The reaction is preferably carried out between 230 and 260° C.

Processes for the preparation of polyglycerol alkylates corresponding to the general formula (7) are also well known and are for example described in US2015 0164771, page 3, paragraph [0020], which is thus herewith incorporated by reference.

Polyglycerols and polyglycerol alkylates corresponding to the general formulae (6) and (7) are also commercially available from a great variety of sources. For example, polyglycerin #310, polyglycerin #500, polyglycerin #750, decaglycerol tri-stearate (TS-7S), decaglycerol decastearate (DAS-7S), hexaglycerol mono-stearate (MS-5S)hexaglycerol di-stearate (SS-5S) are aviailable from Sakamoto Yakuhin Kogyo Co., Ltd., Japan. Natrulon H-6 (Polyglycerin-6), Natrulon H-10 (Polyglycerin-10), polyglyceryl-10 decaoleate (Polyaldo® 10-10-0), polyglyceryl-3 stearate (Polyaldo® 3-1-S), polyglyceryl-6 distearate (Polyaldo® 6-2-S), polyglyceryl-10 stearate (Polyaldo® 10-1-S), polyglyceryl-10 dipalmitate (Polyaldo® 10-2-P), polyglyceryl-10 oleate (Polyaldo® 10-1-0) and polyglyceryl-10 caprylate/caprate (Polyaldo® 10-1-CC) are available from Lonza AG, Switzerland. Polyglycerine-10, Polyglycerine-6, Polyglycerine-4, Polyglycerine-3 is available from Spiga Nord S.p.A., Italy.

The ultraviolet radiation absorbing polymer composition according to the present invention is composed of a complex combination of different molecules (complex reaction products).

This is further illustrated in formula (Ia) representing a preferred polymer compound of the general formula (I) according to the present invention based on a polyglycerol backbone containing 5 glycerol units (examples without limitation):

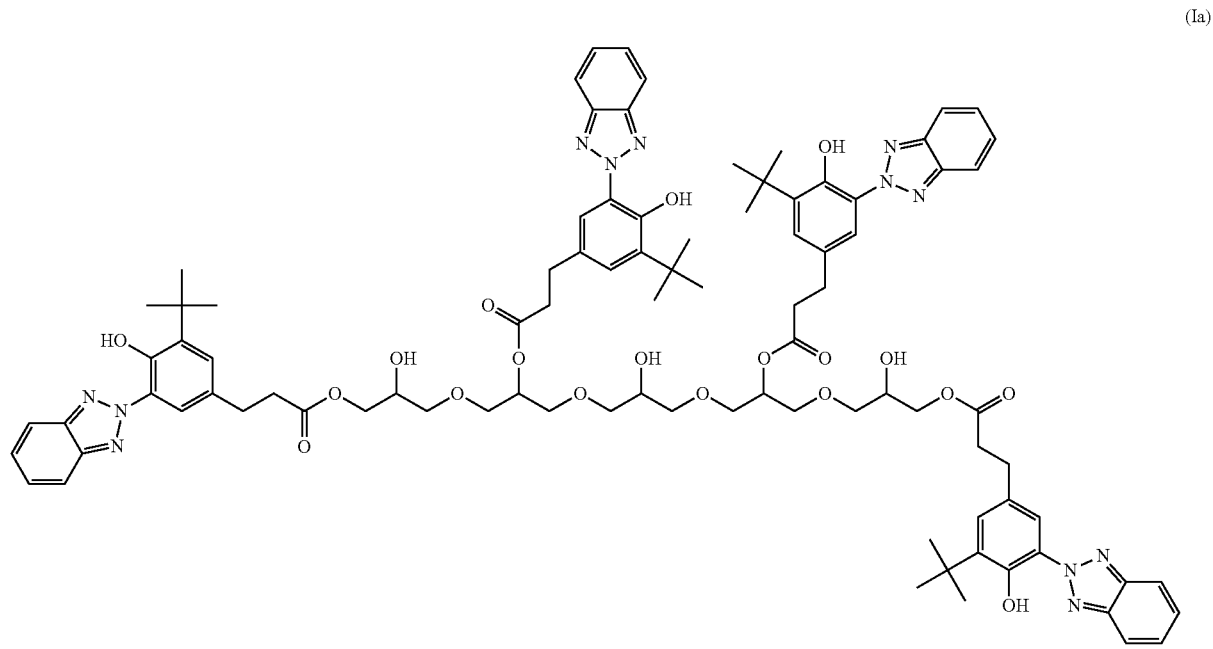

(Ia)

The glycerol backbone typically consists mainly of 3 to 20 glycerol units, whereby the hydroxyl groups of the glycerol backbone are covalently linked to the benzotriazole UV chromophore. It might be reasonably assumed that primary hydroxyl groups (terminal units) react faster than secondary hydroxyl groups, which are less reactive for derivatization. Therefore, some secondary hydroxyl groups remain unreacted. The glycerol backbone consists of primarily linear and unbranched structure units. Branched isomers and higher molecular fractions including more than 20 glycerol units can be present.

Minor components e.g. benzotriazole conjugates of cyclic glycerol oligomers (examples without limitation):

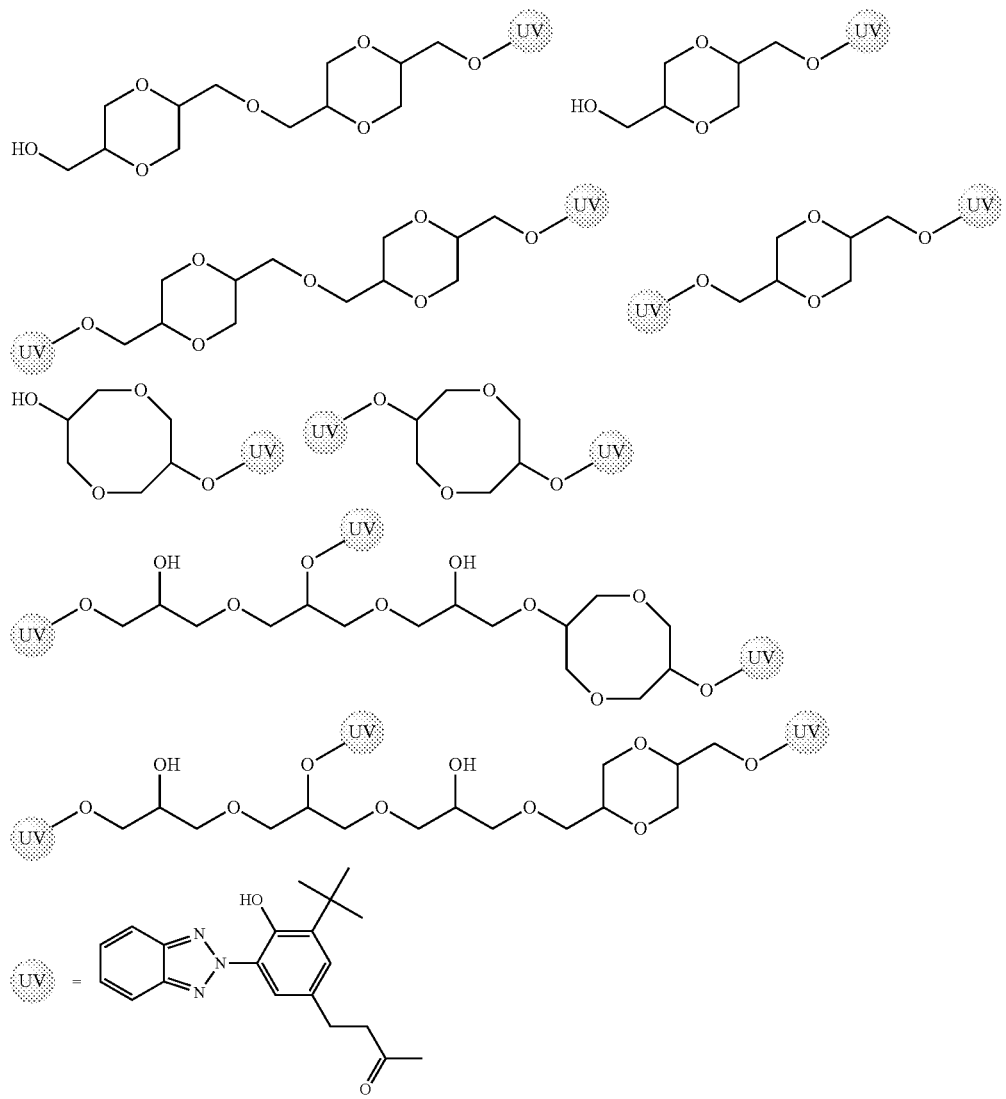

The polymer composition comprising the polymer compound of the formula (Ia) is characterized as follows:
  MW distribution: Mw>300 Da (GPC, calibrated on polystyrene).
  Benzenepropanoic acid, 3-(2H-benzotriazol-2-yl)-5-(1,1-dimethyl ethyl)-4-hydroxy-, methyl ester: ≤5.0% (HPLC).
  Benzenepropanoic acid, 3-(2H-benzotriazol-2-yl)-5-(1,1-dimethyl ethyl)-4-hydroxy-: ≤5.0% (HPLC).
  Sum of concentration of benzenepropanoic acid, 3-(2H-benzotriazol-2-yl)-5-(1,1-dimethylethyl)-4-hydroxy-, methyl ester and benzenepropanoic acid, 3-(2H-benzotriazol-2-yl)-5-(1,1-dimethyl ethyl)-4-hydroxy-: ≤5.0% (HPLC).
  UV-absorption: E 1% 1 cm (344 nm): >200.
  Amount of bound chromophores: >70%.
  Residual catalyst from transesterification reaction (Tin-II-ethyl hexanoate)<700 ppm or essentially free of Sn (IPC)

The characterization of the polymer composition is carried out according to the chapter "Methods" below.

In view of the above, it is appreciated that the ultraviolet radiation absorbing polymer composition additionally comprises, in addition to the polymer compound of the general formula (I), one or more components selected from the group comprising benzenepropanoic acid, 3-(2H-benzotriazol-2-yl)-5-(1,1-dimethylethyl)-4-hydroxy-, methyl ester, benzenepropanoic acid, 3-(2H-benzotriazol-2-yl)-5-(1, 1-dimethylethyl)-4-hydroxy-, methanol and tin.

Preferably, the ultraviolet radiation absorbing polymer composition additionally comprises, in addition to the polymer compound of the general formula (I), benzenepropanoic acid, 3-(2H-benzotriazol-2-yl)-5-(1,1-dimethylethyl)-4-hydroxy-, methyl ester, benzenepropanoic acid, 3-(2H-benzotriazol-2-yl)-5-(1, 1-dimethylethyl)-4-hydroxy-, methanol and tin.

Generally, the concentration of benzenepropanoic acid, 3-(2H-benzotriazol-2-yl)-5-(1,1-dimethylethyl)-4-hydroxy-, methyl ester and/or benzenepropanoic acid, 3-(2H-benzotriazol-2-yl)-5-(1,1-dimethylethyl)-4-hydroxy- in the ultraviolet radiation absorbing polymer composition is ≤5.0 wt.-%, based on the total weight of the ultraviolet radiation absorbing polymer composition.

In one embodiment, the concentration of benzenepropanoic acid, 3-(2H-benzotriazol-2-yl)-5-(1,1-dimethylethyl)-4-hydroxy-, methyl ester or benzenepropanoic acid, 3-(2H-benzotriazol-2-yl)-5-(1,1-dimethylethyl)-4-hydroxy- in the ultraviolet radiation absorbing polymer composition is !5.0 wt.-%, based on the total weight of the ultraviolet radiation absorbing polymer composition. Alternatively, the concentration of each of benzenepropanoic acid, 3-(2H-benzotriazol-2-yl)-5-(1,1-dimethylethyl)-4-hydroxy-, methyl ester and benzenepropanoic acid, 3-(2H-benzotriazol-2-yl)-5-(1,1-dimethylethyl)-4-hydroxy- in the ultraviolet radiation absorbing polymer composition is ≤5.0 wt.-%, based on the total weight of the ultraviolet radiation absorbing polymer composition.

Preferably, the sum of the concentrations of benzenepropanoic acid, 3-(2H-benzotriazol-2-yl)-5-(1, 1-dimethylethyl)-4-hydroxy- and 3-(2H-benzotriazol-2-yl)-5-(1,1-dimethylethyl)-4-hydroxy-, methyl ester in the ultraviolet radiation absorbing polymer composition is ≤5.0 wt.-%, based on the total weight of the ultraviolet radiation absorbing polymer composition. For example, the sum of the concentrations of benzenepropanoic acid, 3-(2H-benzotriazol-2-yl)-5-(1, 1-dimethylethyl)-4-hydroxy- and 3-(2H-benzotriazol-2-yl)-5-(1,1-dimethylethyl)-4-hydroxy-, methyl ester in the ultraviolet radiation absorbing polymer composition is ≤4.0 wt.-%, based on the total weight of the ultraviolet radiation absorbing polymer composition.

In one embodiment, the concentration of tin in the ultraviolet radiation absorbing polymer composition is <700 ppm, more preferably <600 ppm and most preferably <500 ppm.

For example, the ultraviolet radiation absorbing polymer composition is essentially free of tin.

In a preferred method the water or alcohol which is formed during the reaction is removed by distillation during the esterification/transesterification reaction.

Thus, it is preferred that the concentration of methanol in the ultraviolet radiation absorbing polymer composition is <3,000 ppm, preferably <2,500 ppm and most preferably <2,000 ppm.

It is preferred that the esterification/transesterification is carried out at a temperature of 160-270° C., more preferably at a temperature of 190-260° C.

In a further preferred embodiment, the esterification/transesterification is carried out without any additional solvent.

In a further preferred embodiment, the esterification/transesterification is carried out without additional esterification/transesterification catalysts.

In another embodiment the esterification/transesterification is carried out under intermittent or constant vacuum of less than 250 mbar, more preferably of less than 100 mbar.

For example, the esterification/transesterification is carried out at a temperature of 190-260° C. for at least 18 h.

In a further preferred embodiment, the polyglycerol contains less than 5% of glycerol or linear and cyclic diglycerols.

In a further preferred embodiment, the hydroxyl value of polyglycerol is in the range between 700 and 1,100, more preferably between 750 and 900. The hydroxy value is expressed by the mass of potassium hydroxide (KOH) in milligrams equivalent to the hydroxyl content of one gram of the polyglycerol. If not otherwise stated, the hydroxyl value is determined by the general method described in *The International Pharmacopoeia*, Chapter 4.7 "Determination of hydroxyl value", Seventh Edition, 2017.

In one embodiment, the UV chromophore in the polymer compound of the general formula (I) is benzenepropanoic acid, 3-(2H-benzotriazol-2-yl)-5-(1,1-dimethylethyl)-4-hydroxycorresponding to formula (5b).

In a further preferred embodiment, the UV chromophore in the polymer compound of the general formula (I) is benzenepropanoic acid, 3-(2H-benzotriazol-2-yl)-5-(1,1-dimethylethyl)-4-hydroxy-methyl ester corresponding to formula (5a).

In a further preferred embodiment, the final reaction product is used without further purification after synthesis.

In a further preferred embodiment, the ultraviolet radiation absorbing polymer composition (UVRAP) is prepared by reacting 1 part of polyglycerol with 1.0-7.0 parts of benzene propanoic acid, 3-(2H-benzotriazol-2-yl)-5-(1,1-dimethylethyl)-4-hydroxy-methyl ester corresponding to formula (5b).

In another preferred embodiment, the ultraviolet radiation absorbing polymer composition (UVRAP) is prepared by reacting 1 part of polyglycerol with 1.0-7.0 parts of benzene propanoic acid, 3-(2H-benzotriazol-2-yl)-5-(1, 1-dimethylethyl)-4-hydroxy corresponding to formula (5a).

It has been specifically found out by the inventors that the ultraviolet radiation absorbing polymer composition (UVRAP) can be used as UV absorbing agent in a coating for non-living and non-keratinous materials. In particular, the ultraviolet radiation absorbing polymer composition (UVRAP) is characterized by a good photo stability in the coating for non-living and non-keratinous materials. Furthermore, the ultraviolet radiation absorbing polymer composition (UVRAP) can fully react e.g. into isocyanate or melamine crosslinking coatings, and thus results in high migration resistance along with very low volatility.

The ultraviolet radiation absorbing polymer composition comprising the polymer compound of the general formula (I) is thus specifically useful as UV absorbing agent in a coating for non-living and non-keratinous materials. Therefore, they can be used to stabilize a coating for non-living and non-keratinous materials against the effects of light.

It is appreciated that the term "coating for non-living and non-keratinous materials" excludes applications relating to the human or animal body, such as skin care, hair care and the like. That is to say, the "coating for non-living and non-keratinous materials" is applied on wood, ceramic materials, metal, plastics, or articles coated or stained with organic materials.

Thus, the non-living and non-keratinous material is preferably selected from wood, ceramic materials, metal, plastics, and articles coated or stained with organic materials.

The ultraviolet radiation absorbing polymer composition comprising the polymer compound of the general formula (I) is applied as a composition, in particular as a coating, i.e. as a coating composition, for non-living and non-keratinous materials.

The coating composition is preferably a laquer, in particular a stoving laquer which is used for coating automobiles (automobile finishing lacquers), for example stoving lacquers comprising alkyd/melamine resins and alkyd/acrylic/melamine resins (see H. Wagner and H. F. Sarx, "Lackkunstharze" (1977), pages 99-123). Other crosslinking agents include glycouril resins, blocked isocyanates or epoxy resins.

The coating composition may also comprise an epoxy, epoxy-polyester, vinyl, alkyd, acrylic and polyester resin, optionally modified with silicon, isocyanate or isocyanurate (non-acid catalyzed thermoset resins). The epoxy and epoxy-polyester resins are crosslinked with conventional crosslinkers such as acids, acid anhydrides or amines. Correspondingly, epoxide may be utilized as the crosslinking agent for various acrylic or polyester resin systems that have reactive groups on the backbone structure.

A specific coating composition of the present invention is a radiation curable composition comprising ethylenically unsaturated monomers or oligomers and a polyunsaturated aliphatic oligomer.

Of particular interest is the use of the present ultraviolet radiation absorbing polymer composition as stabilizers for coatings for non-living and non-keratinous materials, for example for paints. The invention therefore also relates to those compositions whose component (a) is a film-forming binder for coatings and component (b) is the stabilizer of present invention.

The use of the present ultraviolet radiation absorbing polymer composition in coatings for non-living and non-keratinous materials is accompanied by the additional advantage that it prevents delamination, i.e. the flaking-off of the coating from the substrate. This advantage is particularly important in the case of metallic substrates, including multilayer systems on metallic substrates. Substrates to be coated include wood, ceramic materials, metals, plastics, or articles coated or stained with organic materials.

The binder (component (a)) can in principle be any binder which is customary in industry, for example those described in Ullmann's Encyclopedia of Industrial Chemistry, 5th Edition, Vol. A18, pp. 368-426, VCH, Weinheim 1991. In general, it is a film-forming binder based on a thermoplastic or thermosetting resin, predominantly on a thermosetting resin. Examples thereof are alkyd, acrylic, polyester, phenolic, melamine, epoxy and polyurethane resins and mixtures thereof.

Component (a) can be a cold-curable or hot-curable binder; the addition of a curing catalyst may be advantageous. Suitable catalysts which accelerate curing of the binder are described, for example, in Ullmann's Encyclopedia of Industrial Chemistry, Vol. A18, p. 469, VCH Verlagsgesellschaft, Weinheim 1991.

Preference is given to coating compositions in which component (a) is a binder comprising a functional acrylate resin and a crosslinking agent.

Examples of coating compositions containing specific binders are:
1. paints based on cold- or hot-crosslinkable alkyd, acrylate, polyester, epoxy or melamine resins or mixtures of such resins, if desired with addition of a curing catalyst;
2. two-component polyurethane paints based on hydroxyl-containing acrylate, polyester or polyether resins and aliphatic or aromatic isocyanates, isocyanurates or polyisocyanates;
3. two-component polyurethane paints based on thiol-containing acrylate, polyester or polyether resins and aliphatic or aromatic isocyanates, isocyanurates or polyisocyanates;
4. one-component polyurethane paints based on blocked isocyanates, isocyanurates or polyisocyanates which are deblocked during baking, if desired with addition of a melamine resin;
5. one-component polyurethane paints based on aliphatic or aromatic urethanes or polyurethanes and hydroxyl-containing acrylate, polyester or polyether resins;
6. one-component polyurethane paints based on aliphatic or aromatic urethaneacrylates or polyurethaneacrylates having free amino groups within the urethane structure and melamine resins or polyether resins, if necessary with curing catalyst;
7. two-component paints based on (poly)ketimines and aliphatic or aromatic isocyanates, isocyanurates or polyisocyanates;
8. two-component paints based on (poly)ketimines and an unsaturated acrylate resin or a polyacetoacetate resin or a methacrylamidoglycolate methyl ester;
9. two-component paints based on carboxyl- or amino-containing polyacrylates and polyepoxides;
10. two-component paints based on acrylate resins containing anhydride groups and on a polyhydroxy or polyamino component;
11. two-component paints based on acrylate-containing anhydrides and polyepoxides;
12. two-component paints based on (poly)oxazolines and acrylate resins containing anhydride groups, or unsaturated acrylate resins, or aliphatic or aromatic isocyanates, isocyanurates or polyisocyanates;
13. two-component paints based on unsaturated polyacrylates and polymalonates;
14. thermoplastic polyacrylate paints based on thermoplastic acrylate resins or externally crosslinking acrylate resins in combination with etherified melamine resins;
15. paint systems based on siloxane-modified or fluorine-modified acrylate resins;
16. paint systems, especially for clearcoats, based on malonate-blocked isocyanates with melamine resins (e.g. hexamethoxymethylmelamine) as crosslinker (acid catalyzed);
17. UV-curable systems based on oligomeric urethane acrylates and/or acrylatacrylaten, if desired in combination with other oligomers or monomers;
18. dual cure systems, which are cured first by heat and subsequently by UV or electron irradiation, or vice versa, and whose components contain ethylenic double bonds capable to react on irradiation with UV light in presence of a photoinitiator or with an electron beam.

Coating systems based on siloxanes are also possible, e.g. systems described in WO 98/56852, WO 98/56853, DE-A-2914427 or DE-A-4338361.

A specific coating composition for non-living and non-keratinous materials of the present invention is a powder coating composition.

Particularly preferred coating compositions comprise at least one additive selected from 2-(2'-hydroxyphenyl)benzotriazoles other than that of the polymer compound of the general formula (I) or (Ia), 2-(2-hydroxyphenyl)-1,3,5-triazines, 2-hydroxybenzophenones, and oxanilides.

In the composition, the polymer compound having the formula (I) is in general present in an amount from 0.1% to 10% and more preferably from 0.25% to 5% by weight, based on the weight of the solids content of the coating composition.

Additionally the coating composition may comprise at least one further additive; examples of additives are listed below:

0. (Hindered Amine Light Stabilizers (HALS)

Preferred HALS compounds are those that are available under the trade names Chimassorb®, Tinuvin, Hostavin® and Uvinul. Examples are Chimassorb®119 FL, 2020, or 940, Tinuvin® 111, 292, 123, 144, 152, 249, 492, 494, 622, 765, 770, 783, 791 or C353, Hostavin® 3050, 3051, 3052, 3055, 3058, PR 31, and Uvinul® 4050 H, 4077 H, or 5050 H.

1. Antioxidants
    1.1 Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.
    1.2 Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.
    1.3 Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.
    1.4 Tocopherols, for example α-tocopherol, β-tocopherol, γ-tocopherol, 5-tocopherol and mixtures thereof (vitamin E).
    1.5 Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.
    1.6 Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis-(3,5-dimethyl-2-hydroxyphenyl) butane, 2,2-bis(3,5-di-tert-butyl-4-hydroxyphenyl) propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.
    1.7 O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl) sulfide, isooctyl-3,5-di-tert-butyl-4-hydroxybenzylmercaptoacetate.
    1.8 Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.
    1.9 Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.
    1.10 Triazine derivatives, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.
    1.11 Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.
    1.12 Acylaminophenols, for example 4-hydroxylauranilide, 4-hydroxystearanilide, octyl N-(3,5-di-tert-butyl-4-hydroxyphenyl)carbamate.
    1.13 Esters of 3-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.
    1.14 Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tertbutyl-4-hydroxy-5-methylphenyl)propionyloxy}-1,1-dimethylethyl]-2,4,8,10-tetraoxaspiro[5.5]-undecane.

1.15 Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16 Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17 Amides of 3-(3,5-di-tert-butyl-4-hydroxyphenyl) propionic acid e.g. N,N'-bis(3,5-ditert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl] oxamide (Naugard® XL-1, supplied by Uniroyal).

1.18 Ascorbic acid (vitamin C)

1.19 Aminic antioxidants, for example N,N'-di-isopropyl-p-phenylenediamine, N,N'-di-secbutyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-secbutyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example β,β'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tertoctylphenothiazines, a mixture of mono- and dialkylated tert-octyl-phenothiazines, Nallylphenothiazine, N,N,N',N'-tetraphenyl-1,4-diaminobut-2-ene.

2. UV absorbers and light stabilizers 2.1 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tertbutyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$C$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl] benzotriazole, 6-butyl-2-[2-hydroxy-3-(1-methyl-1-phenylethyl)-5-(1,1,3,3-tetramethylbutyl)phenyl]-pyrrolo[3,4-f]benzotriazole-5,7(2H,6H)-dione.

2.2 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3 Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4 Acrylates, for example ethyl α-cyano-β,β-diphenylacrylate, isooctyl α-cyano-β,β-diphenylacrylate, methyl α-carbomethoxycinnamate, methyl α-cyano-p-methyl-p-methoxycinnamate, butyl α-cyano-p-methyl-p-methoxy-cinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

2.5 Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tertbutylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Other sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tertoctylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-ditert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5] decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis [N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Hostavin (Clariant; CAS Reg. No. 106917-31-1), 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl)ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine, symmetric diesters of hydroxyalkyl-4-hydroxy-tetraalkylpiperidine compounds such as 2,2,6,6-tetramethyl-1-[2-(3,5,5-trimethyl-hexanoyloxy)-ethyl]-piperidin-4-yl ester.

2.7 Oxanilides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl) thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tertbutylphenyl)pentaerythritol diphosphite, tristearyl sorbitol triphosphite, tetrakis(2,4-ditertbutylphenyl) 4,4'-biphenylene diphosphonite, 6-isooctyloxy-2,4,8,10-tetra-tert-butyl-12Hdibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyldibenz[d,g]-1,3,2-dioxaphosphocin, 2,2',2"-nitrilo[triethyltris (3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, Noctyl-alpha-heptylnitrone, N-lauryl-alpha-undecylnitrone, N-tetradecyl-alpha-tridecylnitrone, Nhexadecyl-alpha-pentadecylnitrone, N-octadecyl-alpha-heptadecylnitrone, N-hexadecyl-alphaheptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of thiodipropionic acid (TDPA), for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(pdodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene) sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticizers, lubricants, emulsifiers, pigments, rheology additives, catalysts, flow-control agents, optical brighteners, flame retardants, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-ditertbutylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

The ultraviolet radiation absorbing polymer composition comprising the polymer compound of the general formula (I) can be used for light stabilization of the following coatings for non-living and non-keratinous materials:

| | |
|---|---|
| Grease-filled wire and cable insulation | Gamma-irradiated polyolefins |
| Coatings over plastic substrates | Polycarbonate blends, e.g. PC/ABS, PC/PA |
| Polyolefin tanks or containers containing chemicals | Polyethylene gas pipes |
| | Polyolefin films with an antifog agent |
| Polypropylene non-woven fabric for agricultural applications, e.g. shade cloth | Polyolefin films with IR thermal fillers such as hydrotalcites, e.g. DHT4A |
| Polyolefin films with an antistatic agent | Polypropylene non-woven fabrics |

| | |
|---|---|
| Polypropylene tape or slit film | Flame-resistant molded polypropylene articles |
| Polyethylene non-woven fabrics | |
| Flame-resistant polypropylene fiber | Flame-resistant molded thermoplastic olefins |
| Flame-resistant polethylene film | |
| Automotive coatings | Two-component polyester urethane coatings |
| Two-component acrylic urethane coatings | |
| Pigmented Automotive OEM coatings | Water-borne wood varnishes |
| White polyester/melamine based oil-free alkyd coil coatings | High solids acid catalyzed thermoset acrylic resin enamels |
| Aromatic urethane varnishes | Tung oil phenolic varnishes |
| Medium oil alkyd enamels | Acrylic alkyd refinish enamels |
| Abrasion resistant coating compositions | Electrocoat compositions |
| Chromogenic photographic layers | Coatings over polycarbonate |
| Oil modified urethane alkyds for wood applications | Glycidyl methacrylate-based powder clearcoats |
| Polyolefin articles in contact with chlorinated water, e.g. polyethylene or polypropylene pressure pipes, optionally containing acid scavengers and/or benzofuranones | Pre-formed films for lamination to plastic substrates |

It is appreciated that the coating for non-living and non-keratinous materials is preferably an automotive coating, an industrial coating or a wood coating.

The polymer compound of the general formula (I) is in general present in an amount of from 0.01 to 10% by weight, preferably from 0.1 to 8% by weight, more preferably from 0.5 to 8% by weight and in particular from 1 to 5% by weight, based on the weight of the coating to be stabilized.

The coating for non-living and non-keratinous materials containing the ultraviolet radiation absorbing polymer composition comprising the polymer compound of the general formula (I) described herein can be used for the production of moldings, rotomolded articles, injection molded articles, blow molded articles, films, tapes, mono-filaments, fibers, surface coatings and the like.

In view of the good results obtained, the present invention refers in another aspect to a composition stabilized against light-induced degradation comprising
a) a coating for non-living and non-keratinous materials subject to light-induced degradation, and
b) the ultraviolet radiation absorbing polymer composition (UVRAP) as defined herein.

Thus, the composition stabilized against light-induced degradation comprises
a) a coating for non-living and non-keratinous materials subject to light-induced degradation, and
b) an ultraviolet radiation absorbing polymer composition (UVRAP) comprising the polymer compound of the general formula (I)

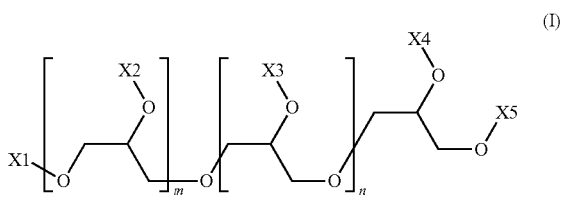

wherein n and m, independently from each other, are a number from 0 to 20, and at least one of m and n is ≥1; and X1, X2, X3, X4 and X5 are the same or different and are independently selected from H, C(O)R1 with R1 being $C_8$-$C_{24}$-alkyl, or a group of the general formula (II)

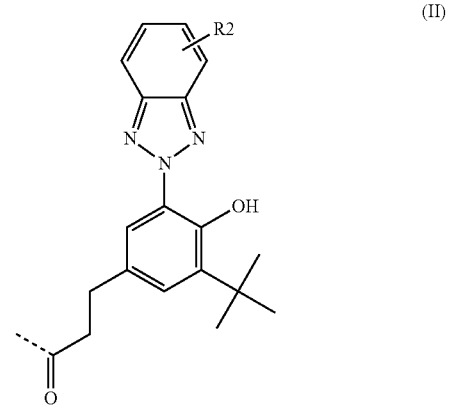

with R2 being H or halogen

The composition preferably contains additionally a sterically hindered amine stabilizer and/or a UV absorber selected from the group of hydroxy-phenyl-s-triazines, oxanilides, hydroxybenzophenones, benzoates, cyanoacrylates and benzotriazoles different from those defined in general formula (I).

It is preferred that the coating is an automotive coating, an industrial coating or a wood coating. In general the compound of general formula (I) is present in an amount of from 0.1 to 10% by weight, based on the dry weight of the coating.

With regard to the definition of the ultraviolet radiation absorbing polymer composition comprising the polymer compound of the general formula (I), coating and preferred embodiments thereof, reference is made to the statements provided above when discussing the technical details of the use of the ultraviolet radiation absorbing polymer composition comprising the polymer compound of the general formula (I).

The scope and interest of the invention will be better understood based on the following examples which are intended to illustrate certain embodiments of the invention and are non-limitative.

EXAMPLES

It is appreciated that all methods described in the following can be analogously applied to other compounds according to the invention.

Methods

Determination of 3-(2H-benzotriazol-2-yl)-5-(1,1-dimethylethyl)-4-hydroxy-benzenepropanoic acid and 3-(2H-benzotriazol-2-yl)-5-(1,1-dimethylethyl)-4-hydroxy-benzenepropanoic acid methyl ester by HPLC Operation range: The concentration of both compounds can be determined from 0.02%-10% w/w %.
Solvents: Water HPLC-quality, acetonitrile HPLC-quality, tetrahydrofurane HPLC-quality, tetrabutyl ammonium hydrogensulfate (TBAHS) HPLC-quality
Column: Eclipse XDB C8 4.6*150 mm 5 µm
Mobile phase A: Water—acetonitrile 9:1+TBAHS 2 g/l
Mobile phase B: Acetonitrile-tetrahydrofurane 1:1
Flow: 1.1 ml/min
Injection volume: 10 µl
Oven temperature: 50° C.
Detection wavelength: 302 nm

| Gradient  | Time [min] | A [%] | B [%] |
|-----------|------------|-------|-------|
|           | 0          | 50    | 50    |
|           | 15         | 2     | 98    |
|           | 20         | 2     | 98    |
|           | 21         | 50    | 50    |
| Post Time | 5          |       |       |

Calibration: The quantification was carried out by means of a single point calibration. About 10 mg of acid ester was weighted in a 100 ml brown volumetric flask and filled up with tetrahydrofurane. The sample was dissolved in an ultrasonic bath for about 5 min and the solution was analyzed. This solution was diluted 1:10 with THF.

Hydrolysis of Ultraviolet Radiation Absorbing Compositions 100 mg of the ultraviolet radiation absorbing composition was dissolved in 100 ml of a solvent mixture (70 parts THF/30 parts 0.1 N NaOH) and 2-3 drops of water were added. The sample must be completely dissolved, otherwise a few drops of water have to be added. The mixture was heated at 50° C. for 2 h in a drying cabinet. After cooling to room temperature, 1 ml of this solution was transferred to a 100 ml volumetric flask and filled up with THF. The content of 3-(2H-benzotriazol-2-yl)-5-(1,1-dimethylethyl)-4-hydroxy-benzenepropanoic acid was analyzed by HPLC.

Amount of Covalently Bound Chromophore:

The amount of chromophore was calculated as w/w % of 3-(2H-benzotriazol-2-yl)-5-(1,1-dimethylethyl)-4-hydroxy-benzene-propanoic acid.

The amount of covalently bound chromophore was determined as follows:

HPLC analysis of the reaction product (determination of the unbound chromophore)

| Compound | % |
|----------|---|
| 3-(2H-benzotriazol-2-yl)-5-(1,1-dimethylethyl)-4-hydroxy-benzene-propanoic acid methyl ester | A |
| 3-(2H-benzotriazol-2-yl)-5-(1,1-dimethylethyl)-4-hydroxy-benzene-propanoic acid | E |
| Sum | S |

HPLC analysis of the completely hydrolyzed reaction product (determination of the unbound and bound chromophore)

| Compound | % |
|----------|---|
| 3-(2H-benzotriazol-2-yl)-5-(1,1-dimethylethyl)-4-hydroxy-benzene-propanoic acid | C |

Amount of covalently bound chromophore T (%):

$$T = C - (A+E) = C - S$$

Determination of E (1%/1 cm) at 343 nm-344 nm by UV spectroscopy:
Spectrophotometer Lamda 950S (or equivalent)
Cell Type: Quarz, 10 mm
Reference: 1.4-dioxane
Temperature: ca.25° C.
Solvent: 1.4-dioxane, spectrophotometric grade
Preparation of the test solutions: About 25 mg of sample was weighed with a precision balance into a 100.0 ml (Vs) volumetric flask. It was filled up to the mark with 1.4-dioxane. 10.0 ml (V) of this solution was diluted to 100.0 ml (Vf) with 1.4-dioxane. The absorbance of this solution was measured between 290 and 450 nm.
Calculation of E (1%/1 cm):
Weighing w=in mg
Total volume of stock solution Vs
Used volume of stock solution V
Final volume of solution Vf
Cell d=10 mm
Wavelength maximum A=343 nm
Measured absorbance at 343 nm A $$E\,(1\%,\,1\,\text{cm}) = A_m \cdot \frac{Vs \cdot Vf * 10}{w \cdot V}$$

Determination of methanol by headspace GC-MS
Standard: Methanol
Solvents: 1,3-Dimethyl-2-imidazolidinone=DMI
Autosampler: Agilent G 1888 Headspace
Temperature: Oven: 100° C. loop: 110° C. transfer Line: 130° C.
Shaking: High
Pressure (psi): Carrier: 17.8 Vial: 13.0
Timing (minutes) Vial Equil.: 30.0
Pressure: 3.00
Loop Fill: 0.20
Loop Equil.: 0.05
Inject: 1.00
Gas Chromatograph: Agilent 6890
Injection technique: Split, 30 ml He/min.
Column: DB-VRX, film thickness 1.4 µm, 60 m×0.25 mm
Carrier gas: He, 1.0 ml/min
Temperatures: Injector: 220° C.
Oven: 2 min 50° C./10° C./min to 260° C./isothermal 15 min
Detector: Agilent 5973 Inert Mass Selective detector
EM Volts: 1718
Solvent Delay: 0.00; detector off: 15.0 min
SIM Modus: Component Ions, methanol 31
A standard calibration curve is generated by plotting the concentration of methanol vs. the peak area obtained.

$$y = mx + b$$

y=peak area
m=slope
x=concentration of methanol (mg/100 ml)
b=y intercept x (mg/100 ml)=(y−b)/m Molecular Weight Distribution by GPC (Benzotriazole Polyglycerol Conjugates IE1-IE10)

Method: Gel Permeation Chromatography with RI-Detection

Standards: EasiVial GPC/SEC Calibration Standards PSS Part.No: PL2010-0201 Agilent Solvents: Tetrahydrofurane HPLC quality, diethanolamine puriss p.a.

Apparatus: Malvern Viscotek with RI-Detector

Chromatography conditions: Column1: PSS SDV 100 000 A, 8×300 mm, 5 u

Column2: PSS SDV 1000 A, 8×300 mm, 5 u

Oven temperature: 40° C.

Mobile Phase: Tetrahydrofurane+3.7 g/L DEA

Flow: 1.0 ml/min

Sample concentration: approx. 2 mg/ml in the same solvent mixture as the mobile phase.

Calibration: Conventional calibration homopolymers. Polystyrene reference samples.

Molecular Weight Distribution by GPC (Benzotriazole Polyglycerol Conjugates IE11, IE12)

Method: Gel Permeation Chromatography with RI-Detection

Standards: Polystyrene Reference Samples from Agilent EasiVial GPC/SEC Calibration Standards Agilent Part.No: PL2010-0401 & PL2010-0402

Solvent: Tetrahydrofuran HPLC-Quality

Apparatus: Agilent with RI-Detector

Chromatography conditions:

Column: Column1 Agilent PLgel 5 um Mixed-D 300×7.5 mm

Column2 Agilent PLgel 5 um Mixed-D 300×7.5 mm Part.No. PL1110-6504

Column temperature: 30° C.

Mobile Phase: Tetrahydrofurane

Flow: 1.0 ml/min, Run time: 30 minutes, Injection volume: 50 µl, Calibration with polystyrene reference samples from Agilent: Polystyrene Low EasiVials Agilent Part N° PL2010-0401 and PL2010-0402

Sample preparation: Dissolve 25 mg of the compound in 10 ml THF. Samples should not be dissolved in an ultrasonic bath, but dissolved under shaking during one hour and allowed to stay one night in the dark prior to be filled in the vials.

Molecular Weight Distribution by GPC (Polyglycerols, Table 1)

Method: Gel Permeation Chromatography with RI-Detection

Standards: Poly(ethylene glycol), PSS-peg1k (PSS Polymer Standards Service GmbH, D-55120 Mainz, Germany)

Mobile Phase: water, 0.3 g/L NaN$_3$

Column1: PSS Suprema, 8×300 mm, 5 u, 30 Ångström

Column2: PSS Suprema, 8×300 mm, 5 u, 1000 Ångström

Column3: PSS Suprema, 8×300 mm, 5 u, 1000 Ångström

Oven temperature: 30° C.

Flow: 1.0 ml/min

Injection volume: 50 uL

Determination of Sn by Inductively Coupled Plasma Atomic Emission Spectrometry (ICP-AES)

The sample preparation was done by pressurized wet digestion in PTFE vessels: About 200 mg of the sample was treated with 3 ml HNO$_3$ at a temperature of about 150° C. for six hours and cooled down to room temperature. The obtained solution was diluted with deionized water to an end volume of 20 ml and directly measured by ICP-AES.

The calibration was done by external standard method with commercially available elemental standard solutions. As a typical apparatus a Varian Vista Pro ICP-AES or Agilent 5100 ICP-AES spectrometer can be used.

Specific wavelengths for evaluation: Sn, 189.924 nm for the quantitative evaluation as well as 133, 138, 143, 146 and 284 nm to check possible interferences.

Synthetic Procedure

1. Preparation of Polyglycerols

Different polyglycerols (or polyglycerol alkyl esters) may be prepared as described in WO 2002 036534, US 2002 0058781, JP 02172938 and U.S. Pat. No. 6,620,904. CaO, Na$_2$CO$_3$ or Ca(OH)$_2$ is used as catalyst. If necessary, glycerol, diglycerol and other low molecular fractions can be removed from the reaction product, e.g. by short path distillation in order to achieve a specific quality. The characterization of the polyglycerols is outlined in table 1.

Polygycerols (or polyglycerol alkyl esters) are also available from Lonza AG, Sakamoto Yakuhin Kogyo Co. Ltd., Spiga Nord S.p.A., Evonik Industries AG.

TABLE 1

Characterization of polyglycerols

| | Mn (GPC) [Da] | Mw (GPC) [Da] | Mw/Mn (GPC) |
|---|---|---|---|
| Polyglycerol-3 | 285 | 306 | 1.1 |
| Polyglycerol-6 | 352 | 739 | 2.1 |
| Polyglycerol-14-monostearate | 606 | 3167 | 5.2 |
| Polyglycerol-10 | 373 | 796 | 2.1 |
| Polyglycerol-14 | 435 | 982 | 2.3 |

2. Preparation of Ultraviolet Radiation Absorbing Polymer Compositions (UVRAP)

IE1: Transesterification product of 3-(2H-benzotriazol-2-yl)-5-(1,1-dimethylethyl)-4-hydroxybenzenepropanoic acid methyl ester with polyglycerol-14

3-(2H-benzotriazol-2-yl)-5-(1,1-dimethylethyl)-4-hydroxy-benzene-propanoic acid methyl ester (630.6 g) was charged into a glass reactor equipped with nitrogen inlet, dephlegmator (120° C.) and agitation. The temperature was set to 190° C. in order to melt the 3-(2H-benzotriazol-2-yl)-5-(1,1-dimethylethyl)-4-hydroxy-benzene-propanoic acid methyl ester. As soon as the 3-(2H-benzotriazol-2-yl)-5-(1,1-dimethylethyl)-4-hydroxy-benzene-propanoic acid methyl ester was completely melted, tin-(II)-2-ethylhexanoate (1.94 g) was added and the reactor was evacuated to 860 mbar. Polyglycerol-14 (204.05 g) was charged within 1 h, while maintaining a reaction temperature of 185-195° C. Methanol was distilled of. Thereafter the vacuum was reduced gradually to 5-8 mbar at 195° C. and the reaction mass was stirred for 64 h, until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzenepropanoic acid was below 1.0%. The composition of the reaction mixture was monitored by HPLC. After cooling down to ambient temperature, the UV-absorbing polymer composition (754 g) was obtained as a yellow to amber glassy solid. The further characterization is outlined in table 4.

IE2: Transesterification product of 3-(2H-benzotriazol-2-yl)-5-(1,1-dimethylethyl)-4-hydroxybenzenepropanoic acid methyl ester with polyglycerol-10

3-(2H-benzotriazol-2-yl)-5-(1,1-dimethylethyl)-4-hydroxy-benzene-propanoic acid methyl ester (630.5 g) was charged into a glass reactor equipped with nitrogen inlet, dephlegmator (120° C.) and agitation. The temperature was set to 176° C. in order to melt the 3-(2H-benzotriazol-2-yl)-5-(1,1-dimethylethyl)-4-hydroxy-benzene-propanoic acid methyl ester. As soon as the 3-(2H-benzotriazol-2-yl)-5-(1, 1-dimethylethyl)-4-hydroxy-benzene-propanoic acid methyl ester was completely melted, tin-(II)-2-ethylhexanoate (1.82 g) was added and the reactor was evacuated to 860 mbar. Polyglycerol-10 (187.61 g) was charged within 1 h, while maintaining a reaction temperature of 185-195° C. Methanol was distilled of. Thereafter the vacuum was reduced gradually to 5-8 mbar at 195° C. and the reaction mass was stirred for 40 h, until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzenepropanoic acid was below 1.0%. The composition of the reaction mixture was monitored by HPLC. After cooling down to ambient temperature, a yellow to amber glassy solid was obtained. 737 g of the crushed solid were dissolved in 512 g ethyl acetate and mixed with 560 g methanol to form an emulsion. The emulsion separated without further stirring in two layers (16 h). The lower layer was removed and transferred to a rotary evaporator. Solvent evaporation under vacuum/150° C. gave the product as a yellow to amber glassy solid (663 g). The further characterization is outlined in table 4.

BRIEF DESCRIPTION OF DRAWINGS

The UV spectrum of the ultraviolet radiation absorbing composition (solvent dioxane) is shown in FIG. 1.

IE3: Esterification product of 3-(2H-benzotriazol-2-yl)-5-(1,1-dimethylethyl)-4-hydroxybenzenepropanoic acid with polyglycerol-14-monostearate Polyglycerol-14-monostearate (253.41 g) was charged into a glass reactor equipped with nitrogen inlet, dephlegmator (120° C.) and agitation. Tin-(II)-2-ethylhexanoate (1.89 g) was added at 120° C. 3-(2H-benzotriazol-2-yl)-5-(1,1-dimethylethyl)-4-hydroxy-benzene-propanoic acid (682.5 g) was charged in portions into a glass reactor. The temperature was set to 175-195° C. in order to melt the 3-(2H-benzotriazol-2-yl)-5-(1,1-dimethylethyl)-4-hydroxy-benzene-propanoic acid. Thereafter the vacuum was reduced gradually to 5-8 mbar at 195° C. and the reaction mass was stirred for 40 h, until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, the UV-absorbing polymer composition was obtained as a yellow to amber glassy solid. The further characterization is outlined in table 4.

IE4: Esterification product of 3-(2H-benzotriazol-2-yl)-5-(1,1-dimethylethyl)-4-hydroxybenzenepropanoic acid with polyglycerol-14-monostearate Polyglycerol-14-monostearate (211.76 g) was charged into a glass reactor equipped with nitrogen inlet, dephlegmator (120° C.) and agitation. Tin-(II)-2-ethylhexanoate (1.87 g) was added at 183° C. 3-(2H-benzotriazol-2-yl)-5-(1,1-dimethylethyl)-4-hydroxy-benzene-propanoic acid (625.0 g) was charged in portions into a glass reactor. The temperature was set to 175-195° C. in order to melt the 3-(2H-benzotriazol-2-yl)-5-(1,1-dimethylethyl)-4-hydroxy-benzene-propanoic acid. Thereafter the vacuum was reduced gradually to 5-8 mbar at 195° C. and the reaction mass was stirred for 40 h, until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, the UV-absorbing polymer composition was obtained as a yellow to amber glassy solid. The further characterization is outlined in table 4.

IE5: Esterification product of 3-(2H-benzotriazol-2-yl)-5-(1,1-dimethylethyl)-4-hydroxybenzenepropanoic acid with polyglycerol-6

Polyglycerol-6 (40.6 g) was charged into a glass flask equipped with nitrogen inlet, dephlegmator (120° C.) and agitation. 3-(2H-benzotriazol-2-yl)-5-(1,1-dimethylethyl)-4-hydroxybenzene-propanoic acid (48.1 g) was charged in portions into the glass flask at 105° C. Tin-(II)-2-ethylhexanoate (0.46 g) was added. The temperature was set to 130° C. in order to suspend the 3-(2H-benzotriazol-2-yl)-5-(1,1-dimethylethyl)-4-hydroxy-benzene-propanoic acid. Thereafter the vacuum was reduced gradually to 3 mbar at 104-132° C. and the reaction mass was stirred for 20 h at 126-132° C., and for 3 h at 126-163° C. until the concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.5%. The composition of the reaction mixture was monitored by HPLC. After cooling down to ambient temperature, the UV-absorbing polymer composition was obtained as a waxy solid (82.7 g). The further characterization is outlined in table 4.

IE6: Transesterification product of 3-(2H-benzotriazol-2-yl)-5-(1,1-dimethylethyl)-4-hydroxybenzenepropanoic acid methyl ester with polyglycerol-6

Polyglycerol-6 (20.06 g) was charged into a glass flask equipped with nitrogen inlet, dephlegmator (120° C.) and agitation. 3-(2H-benzotriazol-2-yl)-5-(1,1-dimethylethyl)-4-hydroxybenzene-propanoic acid methyl ester (48.2 g) was charged in portions into the glass flask at 105° C. Tin-(II)-2-ethylhexanoate (0.56 g) was added. The temperature was set to 120° C. in order to suspend the 3-(2H-benzotriazol-2-yl)-5-(1,1-dimethylethyl)-4-hydroxy-benzenepropanoic acid methyl ester. Thereafter the vacuum was reduced gradually to 3-4 mbar at 150-194° C. (5 h) and the reaction mass was stirred for 16 h at 194° C., until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, the UV-absorbing polymer composition was obtained as a waxy solid (63.0 g). The further characterization is outlined in table 4.

IE7: Transesterification product of 3-(2H-benzotriazol-2-yl)-5-(1,1-dimethylethyl)-4-hydroxybenzenepropanoic acid methyl ester with polyglycerol-6

Polyglycerol-6 (40.19 g) was charged into a glass flask equipped with nitrogen inlet, dephlegmator (120° C.) and agitation. 3-(2H-benzotriazol-2-yl)-5-(1,1-dimethylethyl)-4-hydroxybenzene-propanoic acid methyl ester (48.3 g) was charged in portions into the glass flask at 136-142° C. Tin-(II)-2-ethylhexanoate (0.53 g) was added. The temperature was set to 120-140° C. in order to dissolve the 3-(2H-benzotriazol-2-yl)-5-(1,1-dimethylethyl)-4-hydroxybenzene-propanoic acid methyl ester. Thereafter the vacuum was reduced gradually to 3-5 mbar at 150-196° C. (5 h) and the reaction mass was stirred for 21 h at 193-196° C., until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzenepropanoic acid was below 1.5%. The composition of the reaction mixture was monitored by HPLC. After cooling down to ambient temperature, the UV-absorbing polymer composition was obtained as a waxy solid (82.3 g). The further characterization is outlined in table 4.

IE8: Transesterification product of 3-(2H-benzotriazol-2-yl)-5-(1,1-dimethylethyl)-4-hydroxybenzenepropanoic acid methyl ester with polyglycerol-3

Polyglycerol-3 (40.2 g) was charged into a glass flask equipped with nitrogen inlet, dephlegmator (120° C.) and agitation. 3-(2H-benzotriazol-2-yl)-5-(1,1-dimethylethyl)-4-hydroxybenzene-propanoic acid methyl ester (48.0 g) was charged in portions into the glass flask at 120-140° C. Tin-(II)-2-ethylhexanoate (0.49 g) was added. The temperature was set to 130° C. in order to suspend the 3-(2H-benzotriazol-2-yl)-5-(1,1-dimethylethyl)-4-hydroxy-benzenepropanoic acid methyl ester. Thereafter the vacuum was reduced gradually to 3 mbar at 140-195° C. (3 h) and the reaction mass was stirred for 20 h at 180-195° C. until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, the UV-absorbing polymer composition was obtained as a waxy solid (80 g). The further characterization is outlined in table 4.

IE9: Transesterification product of 3-(2H-benzotriazol-2-yl)-5-(1,1-dimethylethyl)-4-hydroxybenzenepropanoic acid methyl ester with polyglycerol-3

Polyglycerol-3 (20.1 g) was charged into a glass flask equipped with nitrogen inlet, dephlegmator (120° C.) and agitation. 3-(2H-benzotriazol-2-yl)-5-(1,1-dimethylethyl)-4-hydroxybenzene-propanoic acid methyl ester (48.1 g) was charged in portions into the glass flask at 120-144° C. Tin-(II)-2-ethylhexanoate (0.51 g) was added. The temperature was set to 130-145° C. in order to suspend the 3-(2H-benzotriazol-2-yl)-5-(1,1-dimethylethyl)-4-hydroxybenzene-propanoic acid methyl ester. Thereafter the vacuum was reduced gradually to 3 mbar at 154-195° C. (3 h) and the reaction mass was stirred for 20 h at 180-195° C. until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzenepropanoic acid was below 1.0%. The composition of the reaction mixture was monitored by HPLC. After cooling down to ambient temperature, the UV-absorbing polymer composition was obtained as a waxy solid (62 g). The further characterization is outlined in table 4.

IE10: Transesterification product of 3-(2H-benzotriazol-2-yl)-5-(1,1-dimethylethyl)-4-hydroxybenzenepropanoic acid methyl ester with polyglycerol-3

Polyglycerol-3 (7.19 g) was charged into a glass flask equipped with nitrogen inlet, dephlegmator (120° C.) and agitation. 3-(2H-benzotriazol-2-yl)-5-(1,1-dimethylethyl)-4-hydroxybenzene-propanoic acid methyl ester (48.25 g) was charged in portions into the glass flask at 120-140° C. Tin-(II)-2-ethylhexanoate (0.48 g) was added. The temperature was set to 140° C. in order to suspend the 3-(2H-benzotriazol-2-yl)-5-(1,1-dimethylethyl)-4-hydroxy-benzenepropanoic acid methyl ester. Thereafter the vacuum was reduced gradually to 3 mbar at 140-195° C. (3 h) and the reaction mass was stirred for 16 h at 180-195° C. until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 5.0%. The composition of the reaction mixture was monitored by HPLC. After cooling down to ambient temperature, the UV-absorbing polymer composition was obtained as a waxy solid (49.8 g). The further characterization is outlined in table 4.

IE11: Transesterification product of 3-(2H-benzotriazol-2-yl)-5-(1,1-dimethylethyl)-4-hydroxybenzenepropanoic acid methyl ester with polyglycerol-14

3-(2H-benzotriazol-2-yl)-5-(1,1-dimethylethyl)-4-hydroxy-benzene-propanoic acid methyl ester (306.0 kg) was charged into a glass-lined steel reactor equipped with argon inlet, dephlegmator (120° C.) and agitation. The temperature was set to 195° C. in order to melt the 3-(2H-benzotriazol-2-yl)-5-(1,1-dimethylethyl)-4-hydroxy-benzene-propanoic acid methyl ester. As soon as the 3-(2H-benzotriazol-2-yl)-5-(1,1-dimethylethyl)-4-hydroxy-benzene-propanoic acid methyl ester was completely melted, the reactor was evacuated to 850 mbar and tin-(II)-2-ethylhexanoate (20.0 kg) is added. Molten polyglycerol-14 (105.0 kg) was charged within 1-2 h, while maintaining a reaction temperature of 185-190° C. Methanol was distilled of. Thereafter the vacuum was reduced gradually to 5-8 mbar at 195° C. and the reaction mass was stirred for 72 h until the total concentration of 3-(2H-benzotriazol-2-yl)-5-(1,1-dimethylethyl)-4-hydroxybenzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, the UV-absorbing polymer composition (384 kg) was obtained as a yellow to amber glassy solid. The results of the HPLC analysis are shown in tables 2a and 2b. The further characterization is outlined in tables 3 and 4.

TABLE 2a

HPLC analysis of the reaction product (unbound chromophore)

| Compound | % |
|---|---|
| 3-(2H-benzotriazol-2-yl)-5-(1,1-dimethylethyl)-4-hydroxy-benzene-propanoic acid methyl ester | 0.1 |
| 3-(2H-benzotriazol-2-yl)-5-(1,1-dimethylethyl)-4-hydroxy-benzene-propanoic acid | 0.5 |
| Sum | 0.6 |

TABLE 2b

HPLC analysis of the completely hydrolyzed reaction product

| Compound | % |
|---|---|
| 3-(2H-benzotriazol-2-yl)-5-(1,1-dimethylethyl)-4-hydroxy-benzene-propanoic acid | 75.8 |

Amount of covalently bound chromophore: 75.8%–0.6%=75.2% (chromophore, determined as 3-(2H-benzotriazol-2-yl)-5-(1,1-dimethylethyl)-4-hydroxy-benzene-propanoic acid).

TABLE 3

Characterization of IE11

| UV | | Solubility | |
|---|---|---|---|
| | | Solvent | % |
| E 1%, 1 cm [λ = 344 nm] | 331 | C12-15 alkyl benzoate | >40 |
| Methanol [ppm] | 6 | Dibutyl adipate | >40 |

TABLE 3-continued

Characterization of IE11

| UV | | Solubility | |
|---|---|---|---|
| | | Solvent | % |
| $T_g$ [° C.] | 51.2 | Dicaprylyl carbonate | >40 |
| Sn [ppm] | 150 | | |
| Gardner color scale | 6.2 | | |

IE12: Transesterification product of 3-(2H-benzotriazol-2-yl)-5-(1,1-dimethylethyl)-4-hydroxybenzenepropanoic acid methyl ester with polyglycerol-104 (Spiga)

3-(2H-benzotriazol-2-yl)-5-(1,1-dimethylethyl)-4-hydroxy-benzene-propanoic acid methyl ester (632.6 g) was charged into a glass reactor equipped with nitrogen inlet, dephlegmator (120 125° C.) and agitation. The temperature was set to 200° C. in order to melt the 3-(2H-benzo¬tri¬azol-2-yl)-5-(1,1-dimethylethyl)-4-hydroxy-benzene-propanoic acid methyl ester. As soon as the 3-(2H-benzotriazol-2-yl)-5-(1,1-dimethylethyl)-4-hydroxy-benzene-propanoic acid methyl ester was completely melted, tin-(II)-2-ethylhexanoate (0.79 g) was added. Polyglycerol-104 (607.0 g) was charged within 70 min, while maintaining a reaction temperature of 197-200° C. The reaction mixture was stirred for 21 h at 200-225° C. (methanol was distilled of). Thereafter vacuum was applied (gradually to 7 mbar at 223° C.) and the reaction mass was stirred for 3.5 h, until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, a brown waxy solid was obtained (1156 g). The further characterization is outlined in table 4.

TABLE 4

Characterization of inventive examples IE1 to IE12

| Sample # | Reaction of benzotriazole | with polyglycerol | Weight ratio benzotriazole/ polyglycerol | UV Spectrum E11 at 344 nm | % 5a (HPLC) | % 5b (HPLC) | Mn (GPC) [Da] |
|---|---|---|---|---|---|---|---|
| IE12 | 5a | Polyglycerol-14 | 1:1 | 238 | 0.3 | 0.5 | 927 |
| IE11 | 5a | Polyglycerol-14 | 2.9:1 | 331 | 0.1 | 0.5 | 1465 |
| IE10 | 5a | Polyglycerol-3 | 6.7:1 | 400 | 4.0 | 0.1 | 977 |
| IE9 | 5a | Polyglycerol-3 | 2.4:1 | 327 | 0.2 | 0.1 | 261 |
| IE8 | 5a | Polyglycerol-3 | 1.2:1 | 240 | 0.1 | <0.05 | 143 |
| IE7 | 5a | Polyglycerol-6 | 1.2:1 | 243 | 0.2 | 1.1 | 219 |
| IE6 | 5a | Polyglycerol-6 | 2.4:1 | 325 | 0.2 | 0.7 | 478 |
| IE5 | 5b | Polyglycerol-6 | 1.2:1 | 242 | 0.3 | 0.9 | 193 |
| IE4 | 5b | Polyglycerol-14-monostearate (Polyglycerin-14-stearate) | 2.95:1 | 352 | 0.04 | 0.3 | 1562 |
| IE3 | 5b | Poloyglycerol-14-monostearate | 2.7:1 | 330 | 0.02 | 0.5 | 2144 |
| IE2 | 5a | Polyglycerol-10 | 3.4:1 | 353 | 0.4 | 0.3 | 1014 |
| IE1 | 5a | Polyglycerol-14 | 3.1:1 | 343 | 0.4 | 0.4 | 1070 |

| Sample # | Mw (GPC) [Da] | Mw/Mn (GPC) | Solubility at room temperature [%] | | | | |
|---|---|---|---|---|---|---|---|
| | | | Cetiol AB | Cetiol B | Cetiol CC | Xylol | Butyl-acetate | Butyl-glycol |
| IE12 | 1200 | 1.3 | <30 | <30 | <30 | nd | nd | nd |
| IE11 | 1883 | 1.3 | >40 | >40 | >40 | >30 | >30 | >30 |
| IE10 | 1297 | 1.3 | >30 | >30 | >30 | >30 | >30 | >30 |
| IE9 | 630 | 2.4 | nd | >30 | nd | nd | >30 | >30 |
| IE8 | 381 | 2.7 | nd | nd | nd | nd | nd | >30 |

TABLE 4-continued

Characterization of inventive examples IE1 to IE12

| | | | | | | | | |
|---|---|---|---|---|---|---|---|---|
| IE7 | 679 | 3.1 | nd | nd | nd | >30 | nd | nd |
| IE6 | 1109 | 2.3 | >30 | >30 | >30 | >30 | >30 | >30 |
| IE5 | 551 | 2.9 | nd | nd | nd | >30 | nd | nd |
| IE4 | 2219 | 1.4 | >30 | >30 | >30 | >30 | >30 | >30 |
| IE3 | 3852 | 1.8 | >40 | >40 | >40 | >30 | >30 | >30 |
| IE2 | 1867 | 1.8 | >40 | >40 | >40 | >30 | >30 | >30 |
| IE1 | 2062 | 1.9 | >40 | >40 | >40 | >30 | >30 | >30 |

"nd" = not detectable

The molecular weight distribution (GPC) of samples IE1 to IE10 is determined according to a different method than that of samples IE11 and IE12 as indicated above.

Application Examples a. Stabilization of a 2 Component Polyurethane Coating

The ultraviolet radiation absorbing polymer compositions (UVRAP) of the present invention were tested in a clear coat having the following composition:

| I. Polyol component | |
|---|---|
| Macrynal SM 510 n (65%)[a] | 75.0 g |
| Butylglycol acetate | 15.0 g |
| Solvesso 100[b] | 6.0 g |
| Methyl isobutyl ketone | 3.6 g |
| Zn-octoate (8% metal) | 0.1 g |
| BYK 300[c] | 0.2 g |
| Subtotal | 100.0 g |
| II. Isocyanate component | |
| Desmodur N 75[d] (75%) | 40.0 g |
| Total | 140.0 g |
| Resin solids (total): | 56.2% |

[a]OH-functional poly(meth)acrylate (Allnex).
[b]aromatic hydrocarbon mixture, boiling range 182-203° C. (Solvesso 150) or 161-178° C. (Solvesso 100); manufacturer: ESSO.
[c]levelling agent based on dimethylpolysiloxane (Byk Chemie, Wesel, Germany).
[d]isocyanate hardener (75% by weight in methoxypropylacetate/xylene 1:1; Covestro, formerly Bayer Material Science).

2% of the ultraviolet radiation absorbing polymer composition (UVRAP) to be tested was added in a solution in about 5-10 g of Solvesso® 100 to the clear coat, based on the solids content of the coating formulation. The formulations were additionally stabilized with 1.0% by weight, based on the solids content of the coating formulation, of a HALS as co-stabilizer (compound x) with the main component of the formula

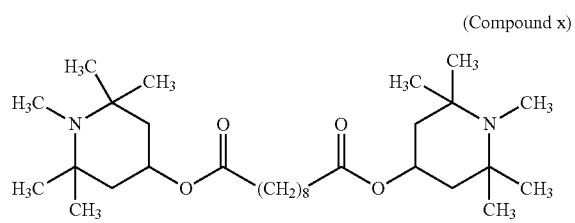

(Compound x)

The compound x is commercially available from BASF as Tinuvin®123.

The comparison used was a clear coat containing no light stabilizer, a clear coat stabilized with HALS only and a clear coat containing the state of the art UV absorber (compound z) in combination with HALS. The compound z is commercially available from BASF as Tinuvin®1130 and comprises as main component a compound of the following formula

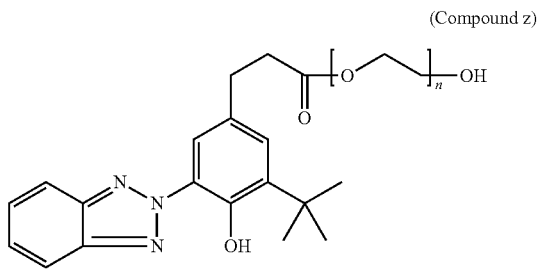

(Compound z)

The clear coat was reduced to spray viscosity with Solvesso®100 and applied onto a silver metallic base coat resulting after cure (130° C. for 30 minutes) in a dry film thickness of 40 µm.

The samples were subjected to weathering cycles according to SAE-J 2527 in Xe-WOM weathering device from Atlas Corp. The gloss retention was determined after 0, 1000, 2000, 3000, 4000 and 5000 h. The results of the gloss retention of the clear coats prepared are outlined in table 5.

TABLE 5

Gloss retention of the clear coat (DFT: 40 µm applied over silver metallic base coat during Xe-WOM exposure (SAE-J 2527))

| | 20° Gloss after hours by Xe-WOM exposure (SAE-J 2527) | | | | | |
|---|---|---|---|---|---|---|
| Sample | 0 h | 1000 h | 2000 h | 3000 h | 4000 h | 5000 h |
| without | 91 | 78 | 57 | | | |
| 1% compound x | 90 | 91 | 88 | 84 | 73 | 55 |
| 2% compound z + 1% compound x | 91 | 91 | 90 | 90 | 90 | 90 |
| 2% IE10 + 1% compound x | 92 | 92 | 92 | 92 | 91 | 90 |
| 2% IE9 + 1% compound x | 92 | 90 | 91 | 91 | 90 | 89 |
| 2% IE8 + 1% compound x | 92 | 91 | 89 | 91 | 89 | 88 |
| 2% IE7 + 1% compound x | 90 | 91 | 89 | 89 | 88 | 86 |
| 2% IE6 + 1% compound x | 91 | 89 | 91 | 91 | 91 | 88 |
| 2% IE5 + 1% compound x | 90 | 91 | 91 | 91 | 89 | 87 |
| 2% IE4 + 1% compound x | 92 | 92 | 92 | 92 | 90 | 90 |
| 2% IE3 + 1% compound x | 92 | 87 | 86 | 86 | 85 | 85 |
| 2% IE2 + 1% compound x | 91 | 91 | 92 | 92 | 91 | 88 |

TABLE 5-continued

Gloss retention of the clear coat (DFT: 40 μm applied over silver metallic base coat during Xe-WOM exposure (SAE-J 2527))

| Sample | 20° Gloss after hours by Xe-WOM exposure (SAE-J 2527) | | | | | |
|---|---|---|---|---|---|---|
| | 0 h | 1000 h | 2000 h | 3000 h | 4000 h | 5000 h |
| 2% IE1 + 1% compound x | 91 | 90 | 91 | 91 | 91 | 89 | b. Stabilization of an Acrylic/Melamine Coating

The ultraviolet radiation absorbing polymer compositions (UVRAP) of the present invention were tested in a clear coat having the following composition:

| | |
|---|---|
| Synthacryl ® SC 303[1)] | 27.51 |
| Synthacryl ® SC 370[2)] | 23.34 |
| Maprenal ® MF 650[3)] | 27.29 |
| butyl acetate/butanol (37/8) | 4.33 |
| isobutanol | 4.87 |
| Solvesso ® 150[4)] | 2.72 |
| Kristallöl K-30 [5)] | 8.74 |
| levelling agent Baysilon ® MA[6)] | 1.20 |
| | 100.00 g |

[1)]acrylate resin (65% solution in xylene/butanol 26:9); Allnex
[2)]acrylate resin (75% solution in Solvesso 100[4)]); Allnex
[3)]melamine resin (55% solution in isobutanol); Ineos Melamines
[4)]aromatic hydrocarbon mixture, boiling range 182-203° C. (Solvesso 150) or 161-178° C. (Solvesso 100); Exxon
[5)] aliphatic hydrocarbon mixture, boiling range 145-200° C.; Shell
[6)]1% in Solvesso 150[4)]; Borchers 2% of the ultraviolet radiation absorbing polymer compositions (UVRAP) to be tested were added in a solution in about 5-10 g of Solvesso® 100 to the clear coat, based on the solids content of the paint. The coating formulations are additionally stabilized with 1% by weight, based on the solids content of the clear coat, of a costabilizer (compound y) of the formula

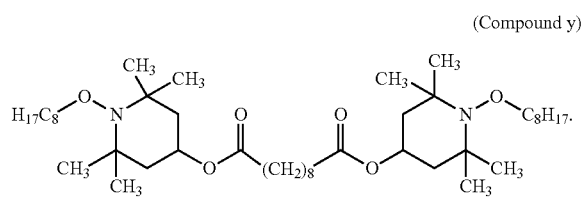

(Compound y)

The comparison used was a clear coat containing no light stabilizer, a clear coat stabilized with HALS only and a clear coat containing the state of the art UV absorber (compound z as shown above) in combination with HALS.

The clear coat was reduced to spray viscosity with Solvesso®100 and applied onto a silver metallic base coat resulting after cure (130° C. for 30 minutes) in a dry film thickness of 40 μm.

The samples were subjected to weathering cycles according to SAE-J 2527 in Xe-WOM weathering device from Atlas Corp. The gloss retention was determined after 0, 1000, 2000, 3000, 4000 and 5000 h. The results of the gloss retention of the clear coats prepared are outlined in table 6.

TABLE 6

Gloss retention of the clear coat (DFT: 40 μm applied over silver metallic basecoat during Xe-WOM exposure (SAE-J 2527))

| Sample | 20° Gloss after hours by Xe-WOM exposure (SAE-J 2527) | | | | | |
|---|---|---|---|---|---|---|
| | 0 h | 1000 h | 2000 h | 3000 h | 4000 h | 5000 h |
| without | 90 | 89 | 23 | 10 | | |
| 1% compound y | 90 | 89 | 88 | 66 | 47 | 32 |
| 2% compound z + 1% compound y | 91 | 89 | 89 | 65 | 59 | 44 |
| 2% IE10 + 1% compound y | 91 | 90 | 90 | 91 | 91 | 90 |
| 2% IE9 + 1% compound y | 90 | 91 | 90 | 90 | 91 | 90 |
| 2% IE8 + 1% compound y | 91 | 90 | 90 | 90 | 90 | 87 |
| 2% IE7 + 1% compound y | 90 | 90 | 91 | 91 | 90 | 89 |
| 2% IE6 + 1% compound y | 90 | 91 | 91 | 91 | 91 | 91 |
| 2% IE5 + 1% compound y | 91 | 90 | 90 | 91 | 90 | 88 |
| 2% IE4 + 1% compound y | 91 | 91 | 90 | 91 | 91 | 91 |
| 2% IE3 + 1% compound y | 91 | 90 | 91 | 91 | 90 | 90 |
| 2% IE2 + 1% compound y | 90 | 89 | 90 | 90 | 90 | 88 |
| 2% IE1 + 1% compound y | 89 | 90 | 89 | 87 | 87 | 88 |

The invention claimed is:

1. A composition stabilized against light-induced degradation, comprising:
   a coating for non-living and non-keratinous materials subject to light-induced degradation, and
   an ultraviolet radiation absorbing polymer composition comprising a polymer compound of the general formula (I)

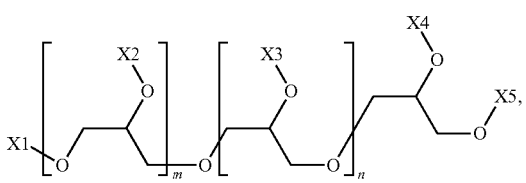

(I)

wherein n and m are each independently a number from 0 to 20, and at least one of m and n is≥1; and
wherein X1, X2, X3, X4, and X5 are the same or different and are each independently selected from the group consisting of H, C(O)R1 with R1 being a $C_8$-$C_{24}$-alkyl, and a group of the general formula (II)

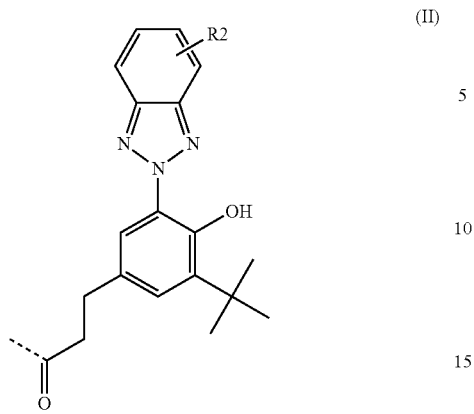
(II)

with R2 being H or a halogen.

2. The composition of claim 1, further comprising a sterically hindered amine stabilizer and/or a UV absorber selected from the group consisting of hydroxy-phenyl-s-triazines, oxanilides, hydroxybenzophenones, benzoates, cyanoacrylates, and benzotriazoles different from those defined in general formula (I).

3. The composition of claim 1, wherein the coating is an automotive coating, an industrial coating, or a wood coating.

4. The composition of claim 1, wherein the polymer compound of general formula (I) is present in an amount of from 0.1 to 10% by weight, based on the dry weight of the coating.

* * * * *